(12) United States Patent
Kline et al.

(10) Patent No.: US 7,248,148 B2
(45) Date of Patent: Jul. 24, 2007

(54) POWER LINE COUPLING DEVICE AND METHOD OF USING THE SAME

(75) Inventors: Paul A. Kline, Gaithersburg, MD (US); Sergey L. Dickey, Farifax, VA (US); William O. Radtke, Ellicott City, MD (US)

(73) Assignee: Current Technologies, LLC, Germantown, MD (US)

( * ) Notice: Subject to any disclaimer, the term of this patent is extended or adjusted under 35 U.S.C. 154(b) by 0 days.

(21) Appl. No.: 11/265,230

(22) Filed: Nov. 3, 2005

(65) Prior Publication Data

US 2006/0125609 A1  Jun. 15, 2006

Related U.S. Application Data

(63) Continuation-in-part of application No. 10/947,929, filed on Sep. 23, 2004, which is a continuation-in-part of application No. 09/924,730, filed on Aug. 8, 2001, now Pat. No. 6,980,089.

(60) Provisional application No. 60/224,031, filed on Aug. 9, 2000.

(51) Int. Cl.
*G05B 11/01* (2006.01)

(52) U.S. Cl. .................... 340/310.01; 340/310.02; 340/310.03; 340/538; 340/531

(58) Field of Classification Search .......... 340/310.01, 340/310.02, 310.03, 310.04, 310.05, 310.06, 340/310.07, 310.08, 538, 531, 530, 533
See application file for complete search history.

(56) References Cited

U.S. PATENT DOCUMENTS

| | | | |
|---|---|---|---|
| 1,547,242 A | 7/1925 | Strieby | |
| 2,577,731 A | 12/1951 | Berger | |
| 3,369,078 A | 2/1968 | Stradley | |
| 3,696,383 A | 10/1972 | Oishi et al. | |
| 3,701,057 A | 10/1972 | Hoer | |
| 3,702,460 A | 11/1972 | Blose | |
| 3,810,096 A | 5/1974 | Kabat et al. | |

(Continued)

FOREIGN PATENT DOCUMENTS

DE  100 12 235 C2  12/2001

(Continued)

OTHER PUBLICATIONS

"Centralized Commercial Building Applications with the Lonworks® PLT-21 Power Line Transceiver", *Lonworks Engineering Bulletin*, Echelon, (Apr. 1997),1-22.

(Continued)

*Primary Examiner*—Benjamin C. Lee
*Assistant Examiner*—Daniel Previl
(74) *Attorney, Agent, or Firm*—Mel Barnes; Capital Legal Group, LLC

(57) ABSTRACT

The invention provides a method and a device for communicating a signal over a power line. One embodiment may comprise a length of power cable that comprises a center conductor substantially surrounded by an insulator. A concentric conductor is disposed external to the insulator over a first portion of the cable. A coupling conductor may be disposed concentrically around a second portion of the cable external to said insulator and having a first end and a second end. The concentric conductor is absent in a manner to form a gap between the concentric conductor and the first end of said coupling conductor. A transceiver cable is coupled to the first end of said coupling conductor and a common mode choke may be disposed substantially around the entire circumference of a portion of said coupling conductor. Finally, the second end of the coupling conductor may be coupled to ground through a convenient neutral conductor.

31 Claims, 19 Drawing Sheets

U.S. PATENT DOCUMENTS

| | | |
|---|---|---|
| 3,846,638 A | 11/1974 | Wetherell |
| 3,895,370 A | 7/1975 | Valentini |
| 3,942,170 A | 3/1976 | Whyte |
| 3,962,547 A | 6/1976 | Pattantyus-Abraham |
| 4,004,110 A | 1/1977 | Whyte |
| 4,016,429 A | 4/1977 | Vercellotti et al. |
| 4,057,793 A | 11/1977 | Johnson et al. |
| 4,142,178 A * | 2/1979 | Whyte et al. ............... 307/149 |
| 4,188,619 A | 2/1980 | Perkins |
| 4,254,402 A | 3/1981 | Perkins |
| 4,263,549 A | 4/1981 | Toppeto |
| 4,323,882 A | 4/1982 | Gajjer |
| 4,383,243 A | 5/1983 | Krügel et al. |
| 4,433,284 A | 2/1984 | Perkins |
| 4,481,501 A | 11/1984 | Perkins |
| 4,569,045 A | 2/1986 | Schieble et al. |
| 4,636,771 A | 1/1987 | Ochs |
| 4,652,855 A | 3/1987 | Weikel |
| 4,668,934 A | 5/1987 | Shuey |
| 4,675,648 A | 6/1987 | Roth et al. |
| 4,686,382 A | 8/1987 | Shuey |
| 4,697,166 A | 9/1987 | Warnagiris et al. |
| 4,724,381 A | 2/1988 | Crimmins |
| 4,745,391 A | 5/1988 | Gajjar |
| 4,746,897 A | 5/1988 | Shuey |
| 4,890,089 A | 12/1989 | Shuey |
| 4,973,940 A | 11/1990 | Sakai et al. |
| 5,210,519 A | 5/1993 | Moore |
| 5,257,006 A | 10/1993 | Graham et al. |
| 5,351,272 A | 9/1994 | Abraham |
| 5,412,254 A * | 5/1995 | Robinson et al. ........... 307/106 |
| 5,485,040 A | 1/1996 | Sutterlin |
| 5,497,142 A | 3/1996 | Chaffanjon |
| 5,537,087 A | 7/1996 | Naito |
| 5,559,377 A | 9/1996 | Abraham |
| 5,592,354 A | 1/1997 | Nocentino, Jr. |
| 5,625,863 A | 4/1997 | Abraham |
| 5,684,450 A | 11/1997 | Brown |
| 5,694,108 A | 12/1997 | Shuey |
| 5,705,974 A | 1/1998 | Patel et al. |
| 5,717,685 A | 2/1998 | Abraham |
| 5,770,996 A | 6/1998 | Severson et al. |
| 5,818,127 A | 10/1998 | Abraham |
| 5,850,114 A | 12/1998 | Froidevaux |
| 5,856,776 A | 1/1999 | Armstrong et al. |
| 5,864,284 A * | 1/1999 | Sanderson .................. 725/103 |
| 5,892,430 A | 4/1999 | Wiesman et al. |
| 5,929,750 A | 7/1999 | Brown |
| 5,933,071 A | 8/1999 | Brown |
| 5,933,073 A | 8/1999 | Shuey |
| 5,937,342 A * | 8/1999 | Kline ......................... 455/402 |
| 5,949,327 A | 9/1999 | Brown |
| 5,994,998 A | 11/1999 | Fisher et al. |
| 6,014,386 A | 1/2000 | Abraham |
| 6,023,106 A | 2/2000 | Abraham |
| 6,040,759 A | 3/2000 | Sanderson |
| 6,104,707 A | 8/2000 | Abraham |
| 6,140,911 A | 10/2000 | Fisher et al. |
| 6,144,292 A | 11/2000 | Brown |
| 6,154,488 A * | 11/2000 | Hunt ........................... 375/219 |
| 6,172,597 B1 | 1/2001 | Brown |
| 6,177,849 B1 * | 1/2001 | Barselotti et al. .......... 333/177 |
| 6,255,935 B1 | 7/2001 | Lehmann et al. |
| 6,282,405 B1 | 8/2001 | Brown |
| 6,297,730 B1 | 10/2001 | Dickinson |
| 6,396,392 B1 | 5/2002 | Abraham |
| 6,407,987 B1 | 6/2002 | Abraham |
| 6,452,482 B1 | 9/2002 | Cern |
| 6,515,485 B1 | 2/2003 | Bullock et al. |
| 6,624,745 B1 | 9/2003 | Willer |
| 6,646,447 B2 | 11/2003 | Cern et al. |
| 6,683,531 B2 | 1/2004 | Diamanti et al. |
| 6,686,832 B2 | 2/2004 | Abraham |
| 6,753,742 B2 | 6/2004 | Kim |
| 6,785,532 B1 | 8/2004 | Rickard |
| 6,809,633 B2 | 10/2004 | Cern |
| 6,844,810 B2 | 1/2005 | Cern |
| 6,897,764 B2 * | 5/2005 | Cern ........................... 375/258 |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,965,303 B2 | 11/2005 | Mollenkopf |
| 6,975,210 B2 | 12/2005 | Cern |
| 6,980,089 B1 | 12/2005 | Kline |
| 6,980,090 B2 | 12/2005 | Mollenkopf |
| 6,982,611 B2 | 1/2006 | Cope |
| 6,998,962 B2 | 2/2006 | Cope et al. |
| 7,042,351 B2 | 5/2006 | Kline |
| 7,046,124 B2 | 5/2006 | Cope et al. |
| 7,046,882 B2 | 5/2006 | Kline |
| 7,061,370 B2 | 6/2006 | Cern |
| 7,102,478 B2 | 9/2006 | Pridmore et al. |
| 2001/0038329 A1 | 11/2001 | Diamanti et al. |
| 2001/0052843 A1 | 12/2001 | Wiesman et al. |
| 2001/0054953 A1 | 12/2001 | Kline |
| 2002/0002040 A1 | 1/2002 | Kline et al. |
| 2002/0097953 A1 | 7/2002 | Kline |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2002/0171535 A1 | 11/2002 | Cern |
| 2003/0054793 A1 | 3/2003 | Manis et al. |
| 2003/0160684 A1 | 8/2003 | Cern |
| 2003/0169155 A1 | 9/2003 | Mollenkopf et al. |
| 2003/0201759 A1 | 10/2003 | Cern |
| 2003/0201873 A1 | 10/2003 | Cern |
| 2003/0210135 A1 | 11/2003 | Cern |
| 2003/0222747 A1 | 12/2003 | Perkinson et al. |
| 2003/0222748 A1 | 12/2003 | Cern et al. |
| 2003/0232599 A1 | 12/2003 | Dostert |
| 2003/0234713 A1 | 12/2003 | Pridmore, Jr. et al. |
| 2004/0003934 A1 | 1/2004 | Cope |
| 2004/0032320 A1 | 2/2004 | Zalitzky et al. |
| 2004/0056734 A1 | 3/2004 | Davidow |
| 2004/0090284 A1 | 5/2004 | Cern |
| 2004/0104798 A1 | 6/2004 | Cern |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0142599 A1 | 7/2004 | Cope et al. |
| 2004/0183619 A1 | 9/2004 | Sugg |
| 2004/0196144 A1 | 10/2004 | Crenshaw et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2005/0046550 A1 | 3/2005 | Crenshaw et al. |
| 2005/0077868 A1 | 4/2005 | Cern |
| 2005/0122092 A1 | 6/2005 | Blasco Claret et al. |
| 2005/0164666 A1 | 7/2005 | Lang et al. |
| 2005/0168326 A1 | 8/2005 | White et al. |
| 2005/0194944 A1 | 9/2005 | Folts et al. |
| 2006/0036388 A1 | 2/2006 | Swartzrauber |
| 2006/0044076 A1 | 3/2006 | Law |
| 2006/0079198 A1 | 4/2006 | Sanderson |
| 2006/0082219 A1 | 4/2006 | Gerszberg et al. |
| 2006/0087382 A1 | 4/2006 | Cern |
| 2006/0244571 A1 | 11/2006 | Yaney et al. |

| | | | |
|---|---|---|---|
| 2006/0261920 | A1 | 11/2006 | Cern et al. |
| 2006/0262881 | A1 | 11/2006 | Cern |
| 2006/0290476 | A1 | 12/2006 | Zitting et al. |

FOREIGN PATENT DOCUMENTS

| | | |
|---|---|---|
| DE | 101 03 530 A1 | 8/2002 |
| DE | 101 19 039 A1 | 12/2002 |
| DE | 101 19 040 A1 | 12/2002 |
| EP | 0 470 185 B1 | 11/1995 |
| EP | 0 913 955 A2 | 5/1999 |
| EP | 0 948 143 A2 | 10/1999 |
| EP | 0 959 569 A1 | 11/1999 |
| EP | 0 916 194 B1 | 9/2001 |
| EP | 1 213 849 A1 | 6/2002 |
| GB | 2 331 683 A | 5/1999 |
| GB | 2 341 776 A | 3/2000 |
| JP | 1276933 | 11/1989 |
| WO | WO-92/16920 A1 | 10/1992 |
| WO | WO-98/33258 A2 | 7/1998 |
| WO | WO-00/59076 A1 | 10/2000 |
| WO | WO-00/60701 A1 | 10/2000 |
| WO | WO-01/08321 A1 | 2/2001 |
| WO | WO-01/43305 A1 | 6/2001 |
| WO | WO-03/034608 A2 | 4/2003 |
| WO | WO-03/040732 A2 | 5/2003 |
| WO | WO-2004/021600 A1 | 3/2004 |

OTHER PUBLICATIONS

"Demand Side Management with LONWORKS® Power Line Transceivers", *LONWORKS Engineering Bulletin*, (Dec. 1996),1-36.

"EMETCON Automated Distribution System", *ABB Power T & D Company, Inc*, (Jan. 1990),1-14.

"IEEE Guide for Power-Line Carrier Applications, ANSI/IEEE Std 643-1980", *The Institute of Electrical and Electronics Engineers, Inc.*, (1980),1-80.

"Intellon Corporation Test Summary for Transformerless Coupler Study", *Intellion No News Wires, DOT/NHTSA Order No. DTNH22-98-P-07632*, (Dec. 24, 1998),1-18.

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992),1-11.

"Summary of an IEEE Guide for Power-Line Carrier Applications", *IEEE Transactions on Power Apparatus and Systems*, (Nov./Dec. 1980),2334-2337.

"White Paper on Medium Voltage Powerline Communication (PLC) Networks", *CIGRE SC D2 WG 14, Broadband PLC*, (Mar. 2005),1-58.

"White Paper on Medium Voltage Powerline Communication (PLC) Networks Annexes", *CIGRE SC D2 WG 14, Broadband PLC*, (Apr. 2005),1-15.

Abraham, K C., et al., "A Novel High-Speed PLC Communication Modem," *IEEE Transactions on Power Delivery*, (Oct. 1992),1760-1768.

Barstow, J M., "A Carrier Telephone System for Rural Service", *AIEE Transactions*, (1947),301-307.

Chang, SS L., "Power-Line Carrier", *Fundamentals Handbook of Electrical and Computer Engineering, vol. II-Communication, Control, Devices and Systems*, (1983),617-627.

Coakley, N G., et al., "Real-Time Control of a Servosytem Using the Inverter-Fed Power Lines to Communicate Senor Feedback", *IEEE Transactions on Industrial Electronics*, (1999),360-369.

Hasler, E F., et al., "Communication Systems Using Bundle Conductor Overhead Power Lines", *IEEE Transactions on Power Apparatus and Systems*, (Mar./Apr. 1975),344-349.

Horiguchi, Akira, "High Speed Power Line Communication Technology", *Mitsubishi Electric Advance* vol. 109, (Mar. 2005),1-27.

Lim, C K., et al., "Development of a Test Bed for High-Speed Power Line Communications", *School of Electrical and Electronic Engineering, Nanyang Technological University, Singapore, IEEE*, (2000), 451-456.

Liu, E , et al., "Broadband Characterization of Indoor Powerline Channel", *Communications Laboratory, Helsinki University of Technology, Finland [presented at the 2004 International Symposium on PowerLine Communications and its Applications, Zaragoza, Spain*, (Mar. 31-Apr. 2, 2004).

Naredo, J L., et al., "Design of Power Line Carrier Systems on Multitransposed Delta Transmission Lines", *IEEE Transactions on Power Delivery*, (1991),952-958.

* cited by examiner

POWER LINE COUPLING DEVICE AND METHOD OF USING THE SAME

CROSS-REFERENCE TO RELATED APPLICATION

This application is a continuation-in-part of, and claims priority to, U.S. patent application Ser. No. 10/947,929 filed on Sep. 23, 2004 (CRNT-0216), which is a continuation-in-part of U.S. patent application Ser. No. 09/924,730 filed Aug. 8, 2001, now U.S. Pat. No. 6,980,084 (CRNT-0011), which claims priority to provisional application No. 60/224,031, filed Aug. 9, 2000. All of these applications are incorporated by reference herein, in their entirety, for all purposes.

FIELD OF THE INVENTION

The present invention relates, generally, to power line coupling devices and in particular, to a coupler for coupling data signals to and from power lines carrying high voltage.

BACKGROUND OF THE INVENTION

Transmitting data to end users has become the main focus of many technologies. Data networks provide the backbone necessary to communicate the data from one point to another. Of course, using existing networks, like electrical power distribution networks, provides the benefit of not having to run new cables, which can create a great expense. On the other hand, using existing networks requires that the components that help carry the data conform to the requirements of the existing networks.

One particular existing network that recently has been used to carry data is the electrical power system. This system has the advantage of providing an existing connection to every customer premise. The electrical power distribution network includes many various divisions and subdivisions. Generally, the electric power system has three major components: the generation facilities that produce the electric power, the high-voltage transmission network that carries the electric power from each generation facility to distribution points, and the distribution network that delivers the electric power to the consumer. Generally, substations act as the intermediary between the high-voltage transmission network and the medium and low voltage distribution network. The substations typically provide the medium voltage to one or more distribution transformers that feed the customer premises. Distribution transformers may be pole-top transformers located on a telephone or electric pole for overhead distribution systems, or pad-mounted transformers located on or in the ground for underground distribution systems.

The sections of the electric power distribution system that are connected to the customers typically are low voltage (LV) sections having a voltage between 100 volts AC and 480 volts AC, depending on the system. In the United States, the low voltage section typically is about 120 volts AC (120 Vrms, 60 Hz). The sections of the power distribution system that provide the power to the low voltage sections are referred to as the medium voltage (MV) sections. The voltage of the MV section typically is in the range of 1,000 Volts to 100,000 volts and typically several thousand volts (e.g., 8.66 kilo volts (kV) to neutral or 15 kV between phase conductors). The transition from the MV section to the LV section of the power distribution system typically is accomplished with a distribution transformer, which converts the higher voltage of the MV section to the lower voltage of the LV section.

The medium and low voltage networks of the electrical power system have been used to establish a data network among the end users. In particular, the medium voltage network acts as an interface between centralized data servers and the low voltage network that connect to the end users. In order to obtain the advantages of using this existing network for transmitting data, however, certain constraints inherent with every power distribution system must be overcome. For example, any connections made between the medium and low voltage networks, outside of the usual and protected transformer interfaces, create concern for the safety of individuals and equipment brought about by the possibility of placing medium voltage levels on the low voltage network. Moreover, the difficulty of providing power to the equipment necessary to network the end user with the medium voltage network must be considered.

Many couplers that have been designed prior to this invention have relied on direct contact with the MV power line. The phase-to-earth ground voltage of the 15 kV system is 8.66 kV. As a consequence, the electronics and power supplies associated with the couplers have to be built to isolate the 8.66 kV potential from earth ground.

Thus, a coupling device should be designed to provide safe and reliable communication of data signals with a medium voltage power line, facilitate bi-directional broadband communications, ensure the safety of installation personnel, and prevent dangerous MV voltage levels from being conducted to the customer premises.

Various embodiments of the coupler of the present invention may provide many of the above features and overcome the disadvantages of the prior art.

SUMMARY OF THE INVENTION

The invention provides a method and a device for communicating a signal over a power line. One embodiment may comprise a length of power cable that comprises a center conductor substantially surrounded by an insulator. A concentric conductor is disposed external to the insulator over a first portion of the cable. A coupling conductor may be disposed concentrically around a second portion of the cable external to said insulator and having a first end and a second end. The concentric conductor is absent in a manner to form a gap between the concentric conductor and the first end of said coupling conductor. A transceiver cable is coupled to the first end of said coupling conductor and a common mode choke may be disposed substantially around the entire circumference of a portion of said coupling conductor. Finally, the second end of the coupling conductor may be coupled to ground through a convenient neutral conductor.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Power-Based Communication System Overview

Figure 1:
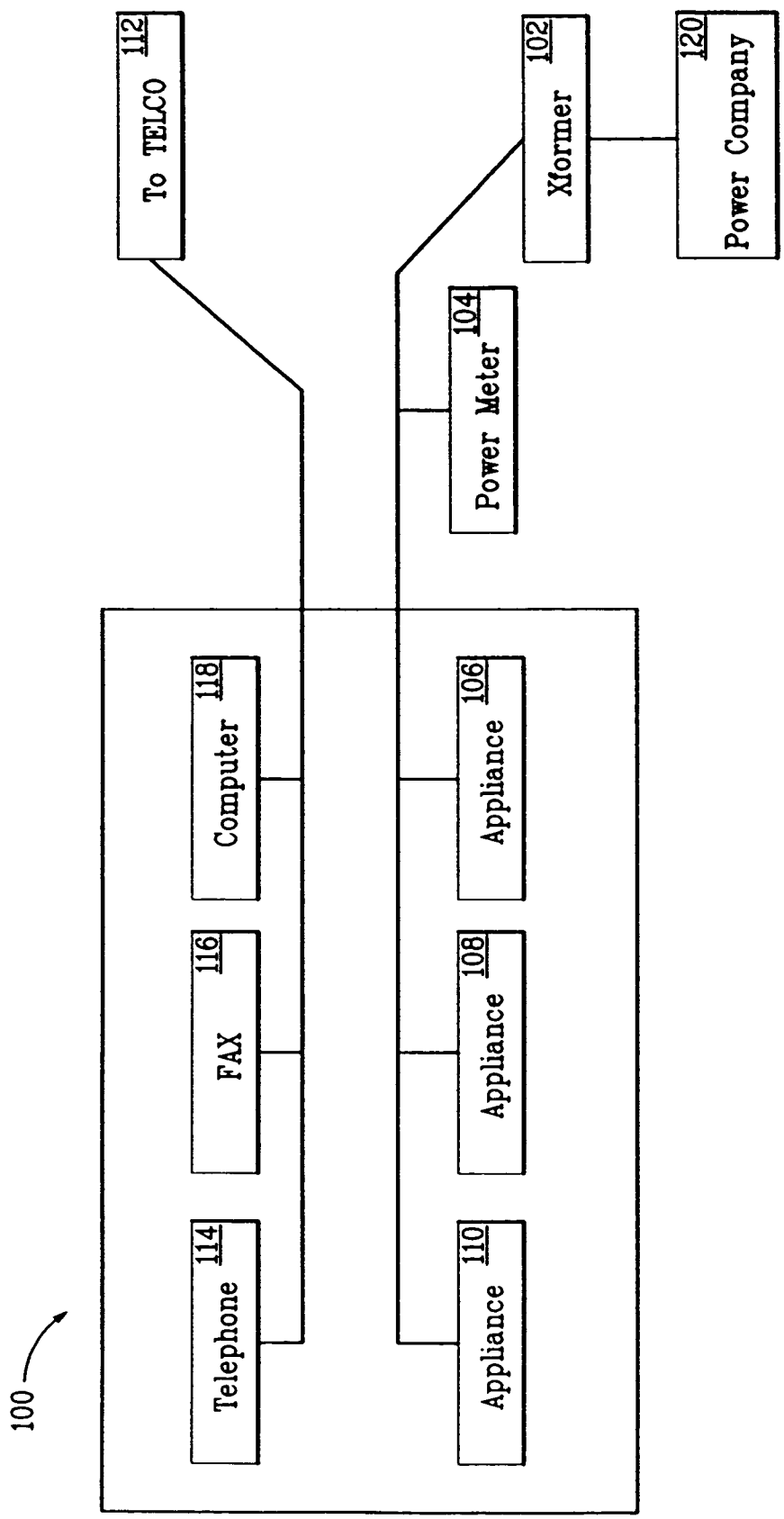
FIG. 1 is a block diagram of a typical electrical power system-based communication system.

FIG. 1 is a block diagram of a typical electrical power system-based communication system 100. It should be appreciated that system 100 may include numerous other components, well known to those skilled in the art. However, the components depicted in system 100 and shown for the purposes of clarity and brevity, while providing a proper context for the invention.

As shown in FIG. 1, a power company 120 distributes power over its network to a power transformer 102. Power transformer 102 can serve several end users. Power transformer 102 provides stepped-down voltage to an electric power meter 104, which may be located with the end user. Power meter 102 is coupled to various appliances 106, 108, and 110, which may represent any type of residential, commercial or industrial electrical equipment. Also, a telephone company 112 provides telecommunication wiring over its network directly to the end user. The telecommunication wiring may be in communication with various devices, including a telephone 114, a facsimile machine 116, and/or a computing device 118. Therefore, FIG. 1 provides an overview of the two separate systems or networks (i.e., telecommunications system and power system) that serve a residential, commercial or industrial end user.

Figure 2:
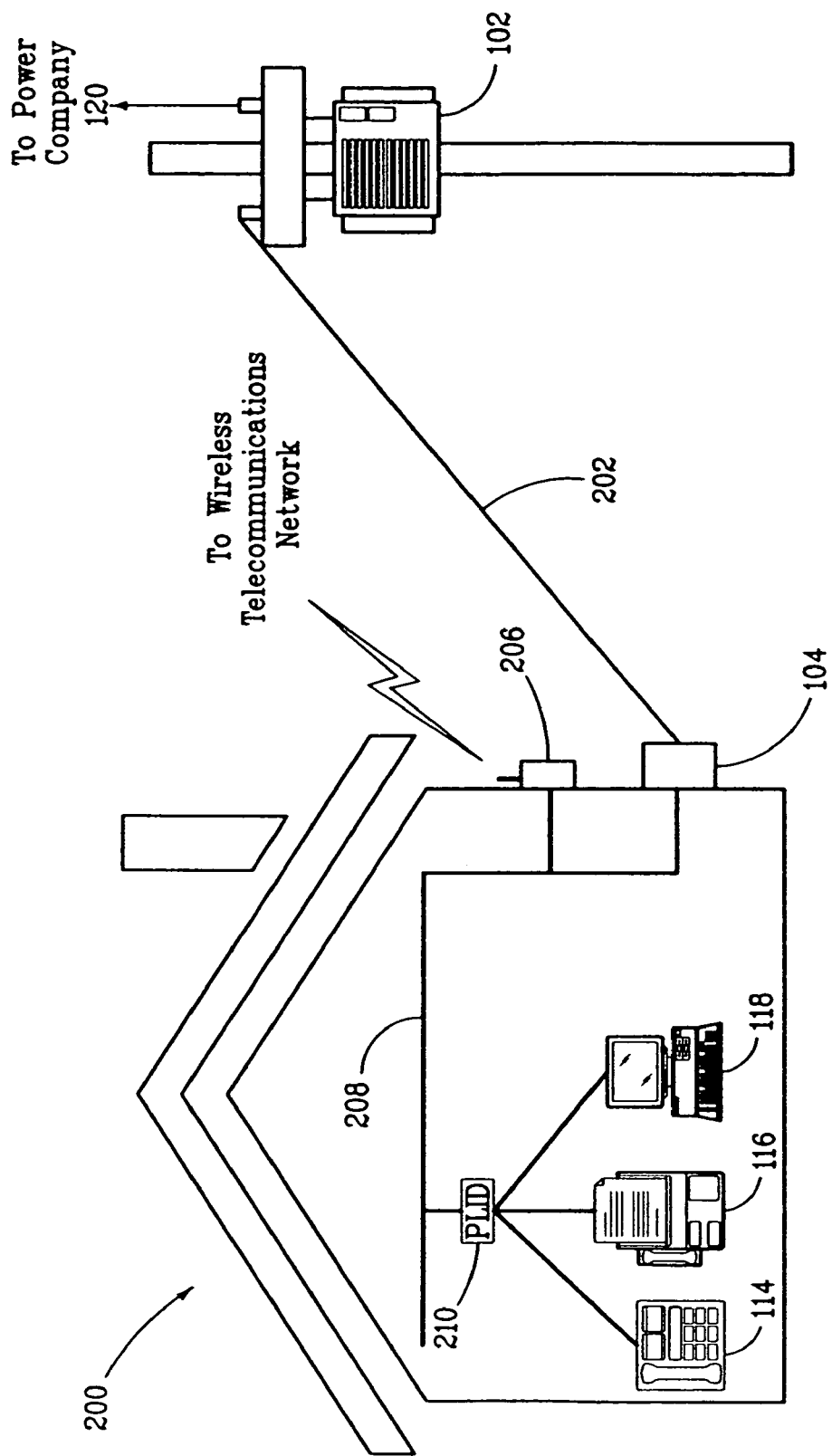
FIG. 2 is a block diagram of a communication system using an electric power system to transfer data.

FIG. 2 is a block diagram of a communication system using an electric power system to transfer data. Although the communication system may include numerous other components, well known to those skilled in the art, the system depicted in FIG. 2 is shown for the purposes of clarity and brevity, while providing a proper context for the invention.

As shown in FIG. 2, power company 120 delivers electrical power (typically in the several kilovolt range) to a power transformer 102. Power transformer 102 steps the voltage level down (e.g., to approximately 110 volts AC or 120 volts AC) as required and provides power over power line 202 to a power meter 104. Also, power transformer 102 provides electrical isolation characteristics. Power is provided from power meter 104 to the residential, commercial or industrial end user via internal power wiring 208. A power line interface device (PLID) 210 is in communication with internal power wiring 208. Currently, internal power wiring 208 for a home or business, for example, typically supports data rates of up to 100 kilobits per second with $10^{-9}$ bit error rate (BER).

PLID 210 provides an interface for plain old telephone service (POTS), and data through for example a RS-232 port or Ethernet connection. Therefore, an end user may use PLID 210 to communicate data over power line 202, via internal power wiring 208, using telephone 114, facsimile machine 116 and/or computer 118, for example. Although not shown in FIG. 2, it should be appreciated that a user can have multiple PLIDs within any particular installation.

Figure 3:
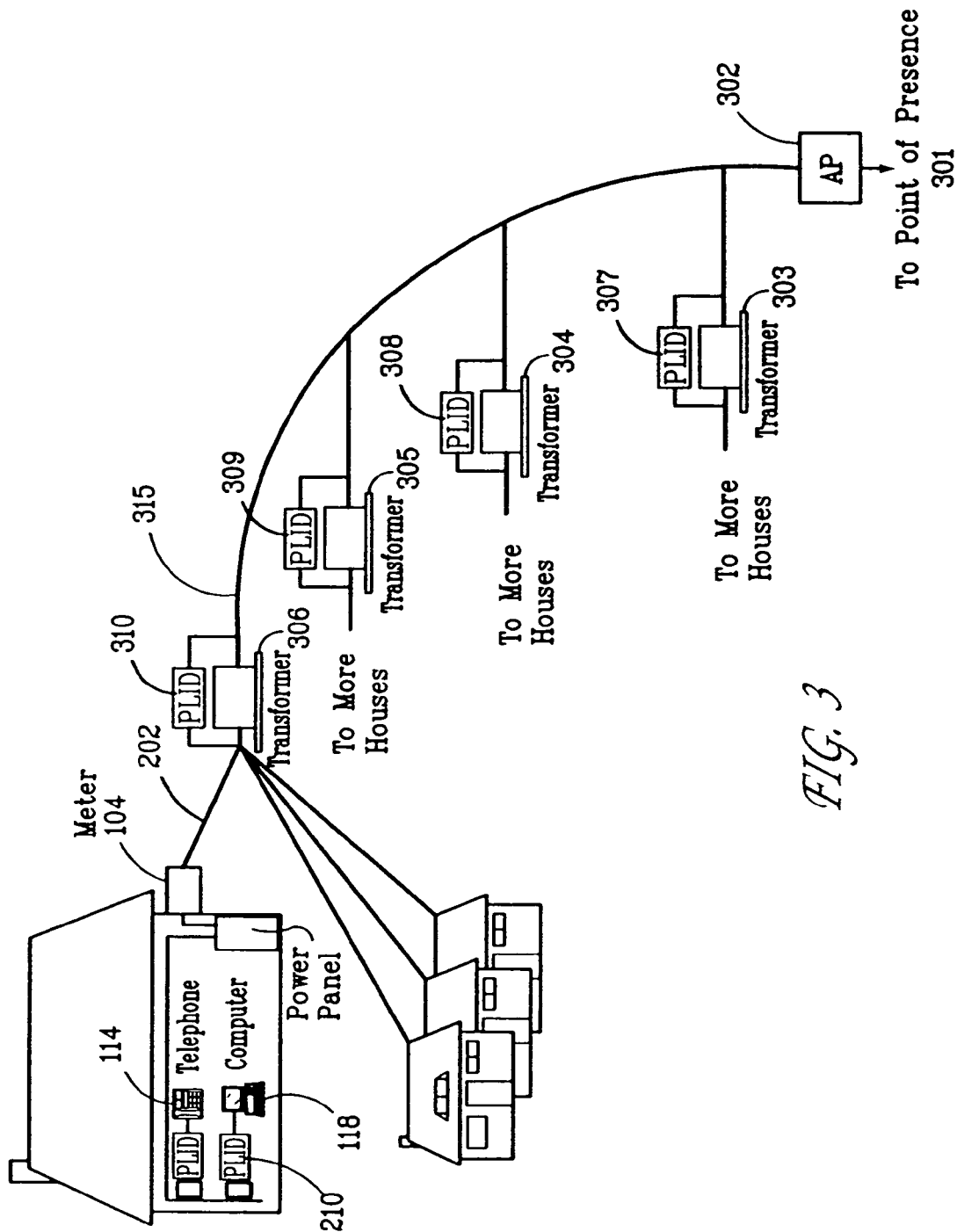
FIG. 3 provides a basic block diagram of the components necessary to connect the medium voltage portion of the system with the low voltage portion.

The connection between power company 120 and power transformer 102 carries medium voltage levels. This portion of the power system has the least amount of noise and least amount of reflections, and therefore has the greatest potential bandwidth for communications. Of course, the low voltage portion of the system must be accessed to interface with the end users. FIG. 3 provides a basic block diagram of the components necessary to connect the medium voltage portion of the system with the low voltage portion in an example system.

As shown in FIG. 3, a series of power transformers 303-306 connect various end users to a point of presence 301 via an aggregation point (AP) 302. AP 302 communications to centralized servers (e.g., the Internet) via a Point of Presence 301 (POP). POP 301 may be a computing device capable of communicating with a centralized server on the Internet, for example. The connection between POP 301 and AP 302 can be any type of communication media including fiber, copper or a wireless link.

Each power transformer 303-306 has an associated Power Line Bridge 307-310 (PLB). PLBs 307-310 provide an interface between the medium voltage on the primary side of the transformer with the low voltage on the secondary side of the transformer. PLBs 307-310 communicate with their respective PLIDs (e.g., PLID 210 and PLB 310) located on the low voltage system. PLBs 307-310 employ MV couplers that prevent the medium voltage from passing to the low voltage side of the system via PLBs 307-310, while still allowing communication signals to be transported between the low voltage and medium voltage systems. The medium voltage couplers therefore provide the necessary isolation traditionally provided by power transformers 303-306. The invention is directed at a novel technique for transporting signals between the medium voltage system and the end users.

The above described power line communications systems (PLCSs) is for example purposes only. In other PLCSs with which the present invention may be used, data may be amplified or repeated at each transformer in both the upstream and downstream directions. In another PLCS, data may be communicated via the medium voltage power line and then communicated wirelessly to and from the customer location (e.g., using an IEEE 802 protocol) via a wireless transceiver. In other examples PLCSs, the data may be transmitted through the distribution transformer to the customer location (e.g., with or without a repeater on the low voltage power line). Thus, the invention is not limited to a particular PLCS, PLCS architecture, or topology.

Prior Art Coupling Techniques

Figure 4:
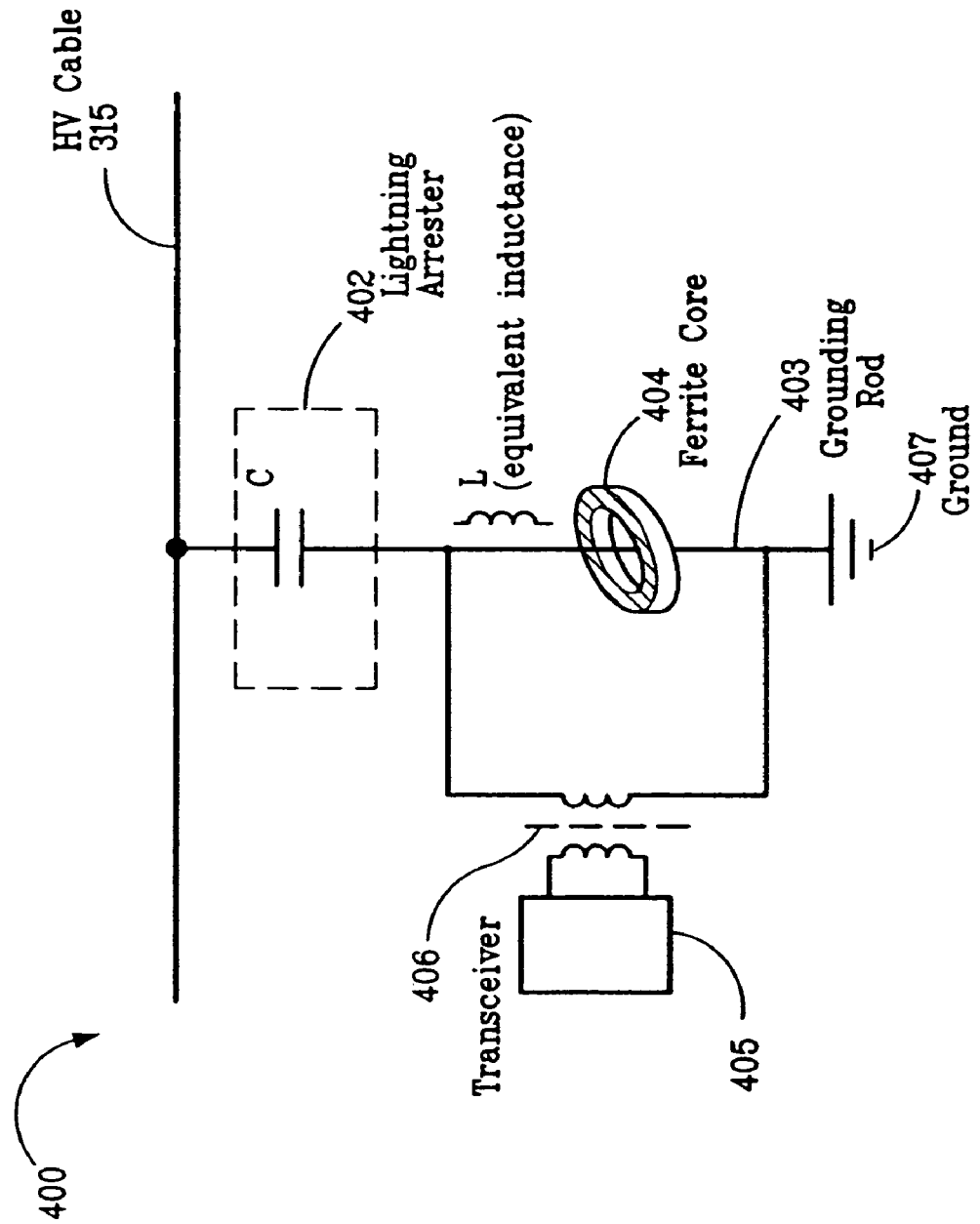
FIG. 4 illustrates a prior art coupling technique.

FIG. 4 is a circuit diagram of a prior art coupling system 400. As shown in FIG. 4, a high-voltage cable 315 is connected to a lightning arrester 402. The term "high-voltage" will be used throughout to describe voltage levels on an electric power system that are higher than typically provided to the end user. The term "low-voltage" will be used throughout to describe voltage levels on an electric power system that are provided to the end user. Lightning arrester 402 is connected to a ground potential 407 by means of a grounding rod 403. The connection between high-voltage cable 315 and ground potential 407 has a certain inductance value that may be increased by placing a ferrite core 404 around grounding rod 403. Also, in practice, lightning arrester 402 typically has a capacitance value in a range of 1 to 170 picofarads (pf) (as will be discussed with reference to FIG. 5). A transformer device 406 is connected in parallel with grounding rod 403 and across ferrite core 404. Transformer device 406 acts to communicate a data signal from high-voltage cable 315 to and from transceiver 405, while providing the necessary isolation from the high voltage carried by high-voltage cable 315. Transceiver unit 405 takes the data signal provided via transformer 406 and transmits and receives data signals from an end user (not shown) or a data server (not shown).

The prior art technique shown in FIG. 4 suffers from many inherent problems. First, although not shown in FIG. 4, a lightning arrester device must be installed on both ends of high-voltage cable 315, and thus could potentially adversely affecting the real and reactive power components provided by high-voltage cable 315. Second, the capacitive value of the lightning arrester must be close to the high end of the available range (e.g., 170 pf) rather than to the low end of the range (e.g., 1 pf) so as to ensure that a sufficient signal over a wide frequency band is provided to transceiver 405 (as discussed further with reference to FIG. 5). Third, system 400 represents a dual-pole RLC circuit, and thus exhibits significant signal degradation over each frequency interval, a large loss or a resonance, as compared to a single pole circuit.

Figure 5:
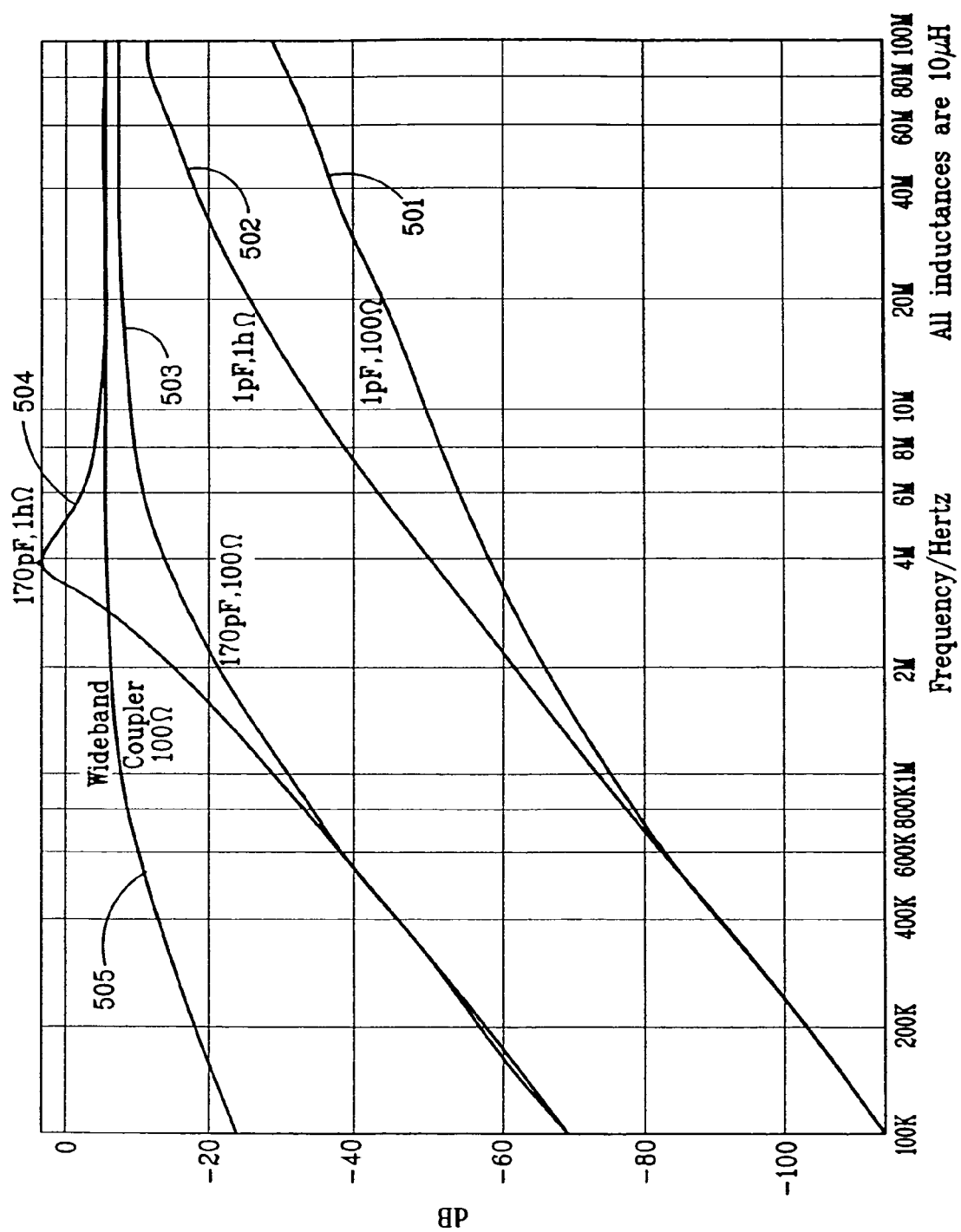
FIG. 5 illustrates a graphical comparative simulation between the coupling technique of FIG. 1 and the coupling technique according to an embodiment of the invention.

FIG. 5 provides the graphical results of SPICE (Simulation Program With Integrated Circuit Emphasis) simulation of system 100. FIG. 5, illustrates the limitations of the signal in the frequency domain in the prior art, as compared to the invention. In particular, FIG. 5 illustrates the attenuation (dB) of a signal over a range of frequencies (Hz) received by transceiver 106 for various capacitive and resistive values that may be provided in system 100, and therefore further illustrates the above-mentioned limitations in the prior art.

For lines 501-505, a signal source with a 50 ohm internal resistance is provided on the high-voltage cable 315. Also, the inductive value for system 100 is set at 10 microhenries.

Graphical line 501 illustrates a capacitive value of 1 pf and a resistive value of 100 ohms. Graphical line 502 illustrates a capacitive value of 1 pf and a resistive value of 1 kilo ohm. Graphical line 503 illustrates a capacitive value of 170 pf and a resistive value of 100 ohms. Graphical line 504 illustrates a capacitive value of 100 pf and a resistive value of 1 kilo ohm. As will be discussed in greater detail, graphical line 505 illustrates the attenuation for frequencies passed by the techniques of the invention. Graphical line 505 is depicted in FIG. 5 for the purpose of comparison with lines 501-504. Notably, graphical line 505 permits a wider range of frequencies to pass with less attenuation than graphical lines 501-504, over most of the frequencies.

As shown in FIG. 5, each of lines 501-502 indicate that system 100 causes a large attenuation for frequencies that are less than 600 kHz. In fact, lines 501-502 causes a greater attenuation than line 505 over the entire range of frequencies depicted in FIG. 5. Accordingly, when system 100 uses capacitive values at the lower end of the available range (e.g., 1 pf), attenuation of the signals is great and therefore undesirable. Similarly, for line 503-504, where the capacitive values are on the higher end of the range (e.g., 100 pf), attenuation is great. Moreover, although line 504 (170 pf and 1 kilo ohm) provides less attenuation over a narrow range of frequencies, line 505 may be more beneficial for providing a better or equal attenuation over a wider range of frequencies. Accordingly, neither high nor low values for system 100 will ensure a uniform coupling in a wide frequency band. Also, as depicted with line 504 at a frequency of 4 MHz, system 100 may exhibit resonant behavior at high coupling coefficients. These variations in the frequency domain can distort the data signal, or at least require additional design considerations for system 100 including transceiver 405, for example. Furthermore, comparing lines 501-504 with line 505 indicates that the dual-pole nature of the prior art circuit leads to a faster rate of coupling decay at lower frequencies. For example, as shown in FIG. 5, from 100 kHz to approximately 2 MHz, lines 501-504 exhibit a 12 dB/octave. This is to be distinguished from the 6 dB/octave decay in line 505 representing the invention's single-pole characteristics.

Figure 6:
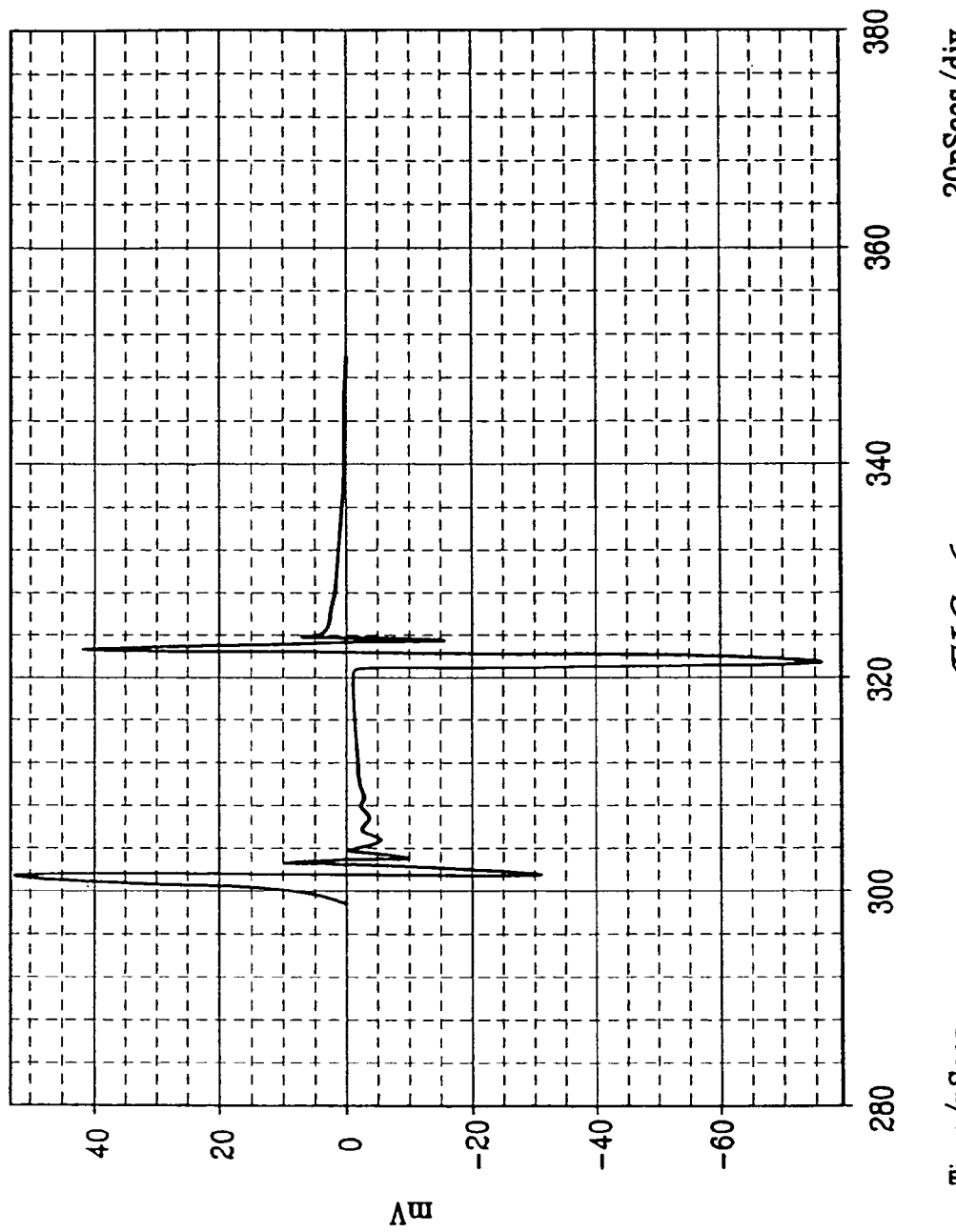
FIG. 6 illustrates pulse transmission with low capacitance of a prior art lightning arrestor, according to the invention.

FIG. 6 further illustrates the inadequacy of prior art system 100 by providing a graphical representation of one of prior art lines 501-504 in the time domain (as compared to FIG. 5's depiction in the frequency domain). In particular, FIG. 6 provides a depiction of the distortion that system 100 causes to a rectangular pulse with a 1 volt and a 100 nanosecond (ns) duration. As shown in FIG. 6, even with a generous grounding-rod inductance of 1 microhenry (μH), the inputted rectangular pulse is significantly distorted. As will be discussed with reference to FIG. 10, the invention provides much less attenuation of the inputted signal.

Finally, because lightning arrester 102 and the grounding rod 103 are connected directly to high-voltage cable 315, any surge appearing on high-voltage line 315 (e.g., a fault caused by lightning) could damage transceiver 105.

Non-Intrusive Coupling

The coupler of the present invention may be used in a transformer bypass device, a backhaul point, a repeater, or at any location at which it is desirable to couple data signals to and/or from a power line and especially a power line carrying voltages (e.g., power lines carrying a voltage above one thousand volts such as medium voltage and high voltage power lines).

Figure 7:
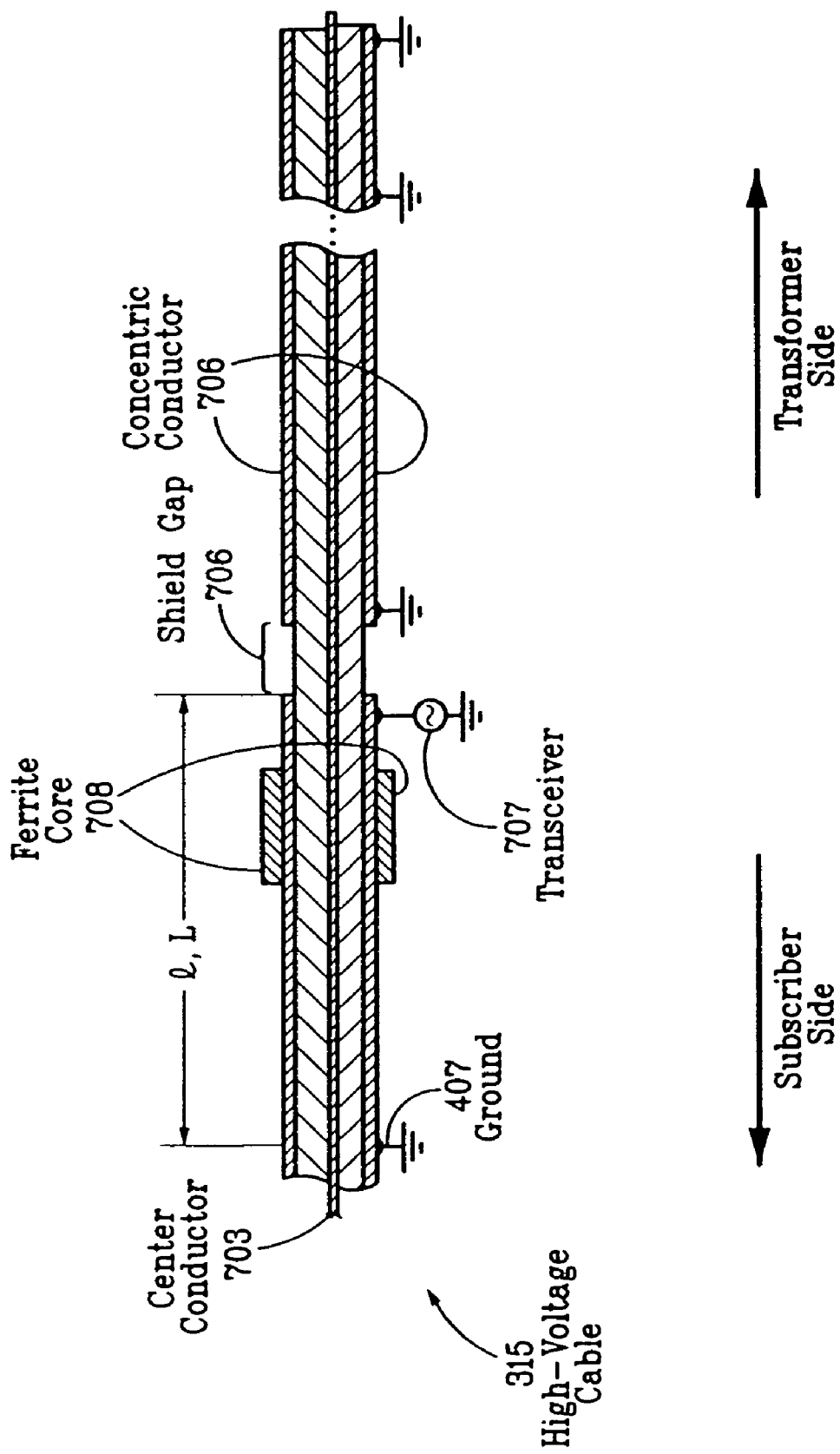
FIG. 7 is a diagram of a coupler technique, according to the invention.

FIG. 7 is a diagram of a coupler technique, according to the invention. In particular, FIG. 7 provides a conceptual diagram of a method for coupling a data transceiver to an electrical power line.

High-voltage cable 315 is shown in FIG. 7. High-voltage cable may be a commercially available distribution cable, for example a 15 kV underground feeder available from Okonite, model Okoguard URO. High-voltage cable 315 has a center conductor 703. Center conductor 703 typically is a stranded aluminum conductor with a rating capable of carrying current at medium voltage levels. Center conductor 703 has one or more insulative covers (not shown). The insulation on center conductor 703 is surrounded by a concentric conductor 704. Concentric conductor 704 typically is found on underground distribution feeders, but also may be found on certain overhead distribution feeders. Concentric conductor 704 typically does not carry high voltage, but acts as a shield to reduce the inductance caused by center conductor 703. Concentric conductor 704 also may act to carry the neutral current back to the power source. Concentric conductor 704 is surrounded by an outer insulating sleeve (not shown). The outer insulating sleeve provides protection and insulative properties to high-voltage cable 315. High-voltage cable 315 is assumed to be AC-terminated at its ends.

In accordance with the invention, high-voltage cable 315 may be modified to facilitate the use of high-voltage cable 315 in carrying desired data signals. In particular, a shield gap 706 has been cut in concentric conductor 704 around the entire periphery of high-voltage cable 315. Shield gap 706 effectively divides concentric conductor 704 into two parts. In addition, a transceiver 707 is in communication with high-voltage cable 315 by a connection to concentric conductor 704. It should be appreciated that transceiver 707 may be a fiber-optic transceiver (as will be discussed further with reference to FIG. 6), capable of receiving and transmitting any type of data signal (e.g., radio frequency signals).

The terms "subscriber side" and "transformer side" will be used throughout to describe the two sides of high-voltage cable 315 relative to shield gap 706. Subscriber side will be used to describe the portion of high-voltage cable 315 to which transceiver 707 is coupled. This is consistent with the fact that the subscriber (i.e., end user) is in communication with transceiver 707. Transformer side will be used to describe the portion of high-voltage cable 315 to which transceiver 707 is not coupled. This is consistent with the fact that the pole-top or pad-mount transformer is coupled to the transformer side of high-voltage cable 315.

The ground connection 107 (along with other ground connections along the length of high-voltage cable 315) is provided at a distance I from the subscriber side of shield gap 706. High-voltage cable 315 has an inductance that depends on the distance I from ground, as well as other characteristics of high-voltage cable 315 (e.g., diameter and distance from ground plane). Inductance L performs a function similar to the inductance of grounding rod 103 described with reference to FIG. 4. In particular, in order to decrease the attenuation of low-frequency signals by coupling technique, inductance L may be increased. Increasing inductance L may be accomplished by placing additional ferrite cores 708 along the length of high-voltage cable 10. However, a more complete discussion of the placement of the grounding and inductive means is beyond the scope of the invention.

The length distance I should not be significantly longer than a quarter-wave-length at the highest frequency in the transmission band, so as to prevent any resonant behavior that may increase transmission attenuation. Because the input reactance of the high-voltage cable 315 is proportional to its characteristic impedance, increasing the impedance as much as practically possible ensures low attenuation at the low end of the frequency band. This is further ensured by using a relatively high ratio of the outer and inner diameters of high-voltage cable 315, as well as by using ferrite cores 708 with high relative permeance (e.g., 8 maxwell/gilbert).

Figure 8:
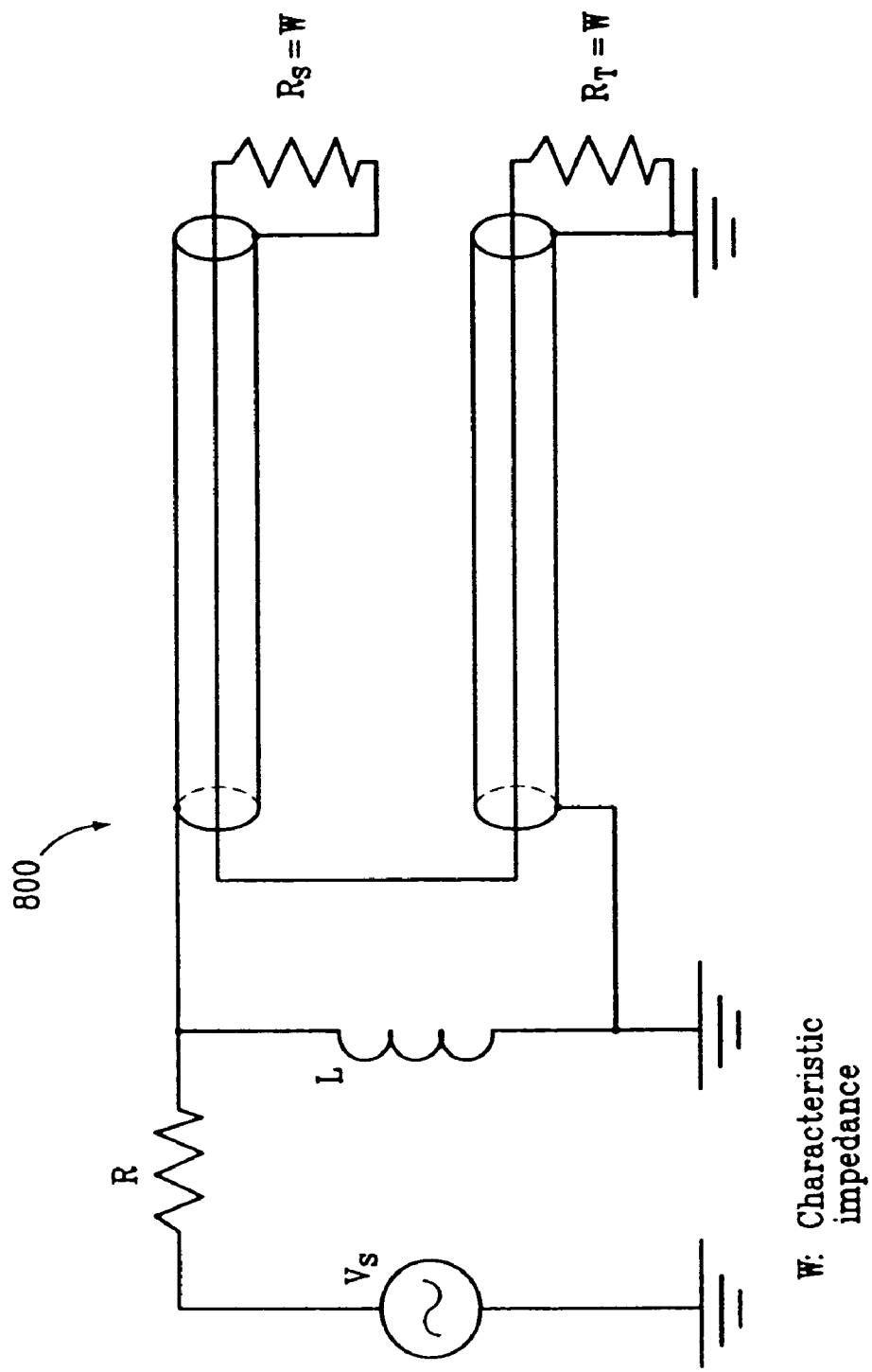
FIG. 8 is an equivalent circuit coupler technique of FIG. 4, according to the invention.

FIG. 8 is a circuit diagram 800 representing the salient properties of the components depicted in FIG. 7. As shown in FIG. 8, the subscriber side and transformer side of high-voltage cable 315 may be represented by two separate impedances, $R_S$ and $R_T$, respectively, connected in series to each other. Also, inductance L, which represents the inductance of high-voltage cable 315 from shield gap 706 to ground 407 as discussed with reference to FIG. 7, is placed in parallel to impedances $R_S$ and $R_T$. It should be appreciated that in one embodiment, for example, inductance L depicted in FIG. 8 may be represented in practice by an input impedance of a short piece of a shortened coaxial line. Finally, the signal source may be represented by a voltage $V_S$ and by an internal resistance R. Also, it should be appreciated that signal source may be replaced by a signal load that receives a signal.

It may be assumed that the respective impedances of subscriber side and the transformer side (i.e., $R_S$ and $R_T$, respectively) are matched (i.e., equal), and therefore may be represented by W, the characteristic impedance of high-voltage cable 315. Because of the impedance matching on the subscriber side and transformer side, each side carries half of the signal power. As discussed with reference to FIG. 5, this technique provides an approximately 6 dB loss per octave, as compared to the 12 db per loss octave typically found in the prior art. Also, circuit 800 has a single-pole characteristic at lower frequencies, because the frequency response of circuit 800 is defined by the "RL" circuit defined by R and L.

Optimizing the internal resistance of the source (or the load) also may be considered. One the one hand, to ensure maximum power in the load, it is desirable to match the sources internal resistance with the resistance of the line to which it is connected (i.e., 2 W). On the other hand, from the point of view of the subscriber side and/or the transformer side, the internal resistance of the source is in series with the other cable. Therefore, the reflection created in the cable by the "matched" value of R will be ½, as described by the following reflection coefficient:

$$K=(3W-W)/(W+3W)=\frac{1}{2} \qquad (1)$$

Because the two of the couplers are intended to be included between the terminations at the two ends of the line, and if the RF attenuation of the cable in the transmission band is low, it may be desirable to adopt a reasonable trade off. By increasing the voltage amplitude of the source $V_S$ and lowering its internal resistance R, the reflections can be brought to a more desirable level. For example, when R=W, the reflection coefficient is reduced to ⅓ as follows:

$$K=(2W-W)/(W+2W)=\frac{1}{3} \qquad (2)$$

It should be appreciated that the examples provided by equations (1) and (2) are just one possible configuration, and are not meant to be exclusive. In practice, for example, a value of K may be chosen with consideration of the attenuation provided by the particular characteristics of high-voltage cable 315 so as to keep reflections at an acceptable level.

Figure 9:
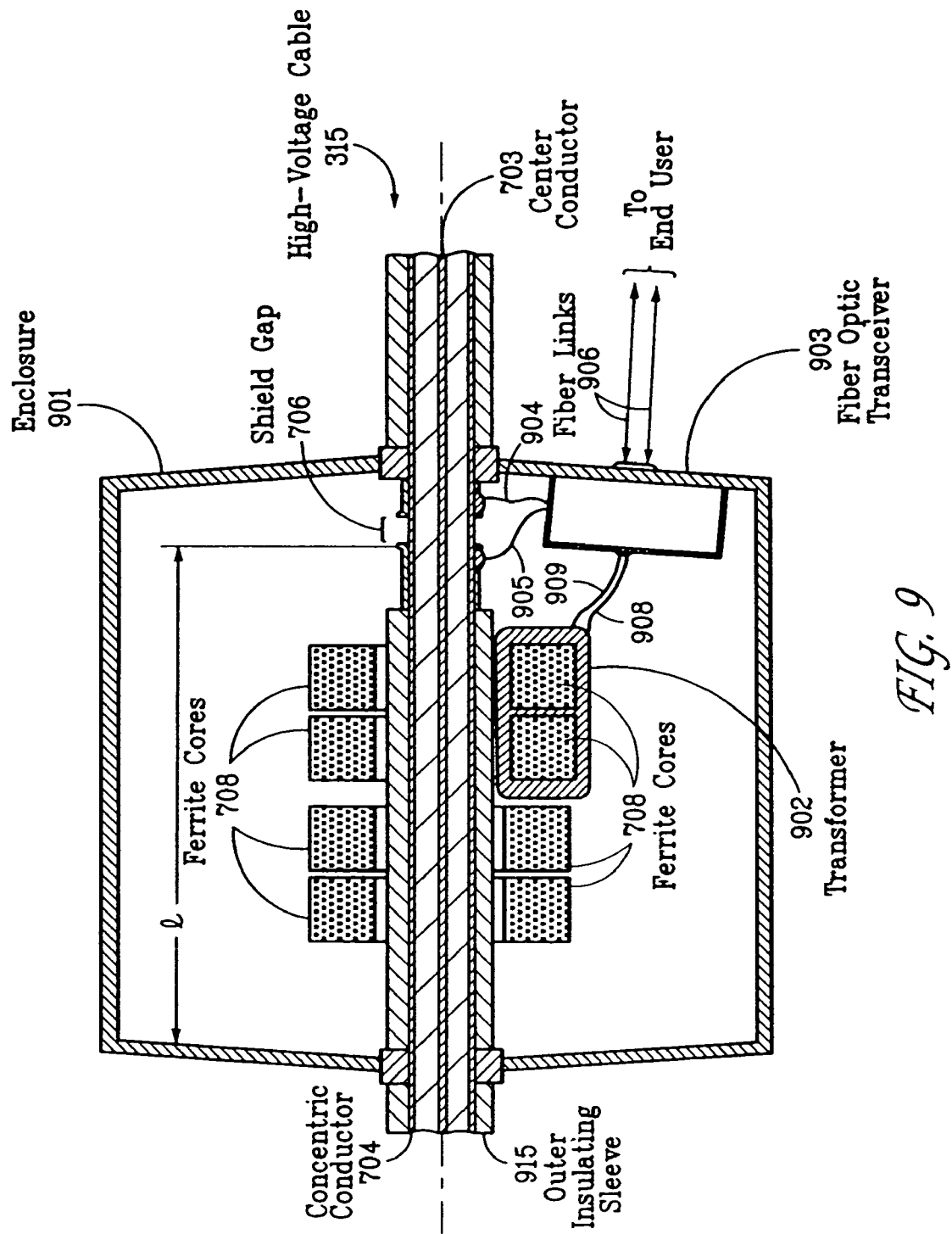
FIG. 9 illustrates a coupler, according to the invention.

FIG. 9 provides an example of a coupler, according to the invention. Although FIG. 9 illustrates the physical configuration of the inventive method, it will be appreciated that the invention may be implemented in any number of configurations (e.g., using various types of enclosures and/or various types of grounding techniques). Accordingly, it should be appreciated that FIG. 9 provides just one example of a coupler contemplated by the invention.

As shown in FIG. 9, high-voltage cable 315 is depicted having center conductor 703, concentric conductor 704, outer insulating sleeve 915, and shield gap 706. In addition, a metal enclosure 901 provides the needed uninterrupted way for the power current flow to back over the interrupted concentric conductor 704. Also, metal enclosure 901 also provides the necessary ground connection (described as ground 407 in FIGS. 4 and 7), and it forms an outer shield for a piece of shortened coaxial line that may be used to provide inductive shunt impedance (described as L with reference to FIGS. 7 and 8).

High-voltage cable 315 also has a series of ferrite cores 708 on the outer side of high-voltage cable 315. Using multiple ferrite cores increases the impedance of subscriber side of high-voltage cable 315 with the length I (as discussed with reference to FIG. 7). Also, ferrite cores may increase the equivalent inductance L of the high-voltage cable 315, which has the same effect as increasing the impedance. Ferrite cores 708 also may provide a current transforming function. As shown in FIG. 9, two of ferrite cores 708 have conductors wound around their perimeter to form a transformer device 902. Although the invention has been described as using ferrite cores, it should be appreciated that other types of cores may be used as well.

Transformer 902 is coupled to a fiber optic transceiver 903. Fiber optic transceiver 903 may be a transmitter/receiver pair commercially available from Microwave Photonic Systems, part number MP-2320/TX (for the transmitter) and part number MP-2320/RX (for the receiver). Fiber optic transceiver 903 is connected to transformer 902 over lines 908 and 909.

In operation, transformer 902 acts to induce an AC current from the high voltage carried by center conductor 703. The induced alternating current is provided to fiber optic transceiver 903 via lines 908 and 909. In addition to having the transmitter/receiver pair, fiber optic transceiver 903 may have circuitry capable of rectifying the AC voltage provided by transformer 902 to a DC voltage. The DC voltage may be in a range (e.g., 12 volts) capable of powering the transmitter/receiver pair in fiber optic transceiver 903, so as to transmit and receive data to the end user over fiber links 906. Also, fiber optic transceiver 903 may have a filtering device (not shown) coupled to lines 908 and 909 so as to pass the AC current in a desired frequency range (e.g., 60 Hz using a low-pass filter).

The data provided to and received from the end users is carried back to a central server (not shown) from fiber optic transceiver 903 via data links 904 and 905. Data links 904 and 905 are in communication with concentric conductor 704. Because concentric conductor 704 typically is not used to carry high voltage, but acts as an inductive shield for high-voltage cable 315, data may be carried to and from the end user via concentric conductor 704. Also, fiber optic transceiver 903 may have a filtering device (not shown) coupled to lines 904 and 905, so as to pass data signals in a desired frequency range (e.g., signals well above 60 Hz using a high-pass filter), while preventing other signals from passing onto fiber optic transceiver 903 (e.g., 60 Hz power).

The invention was described using a fiber optic-based transceiver. Using a fiber optic transceiver provides the necessary isolation to the end user from the medium or high voltage on center conductor 703, and therefore ensures the safety of people and equipment. However, it should be appreciated that the invention contemplates the user of other types of transceivers, for example, where such isolation is not required.

Figure 10:
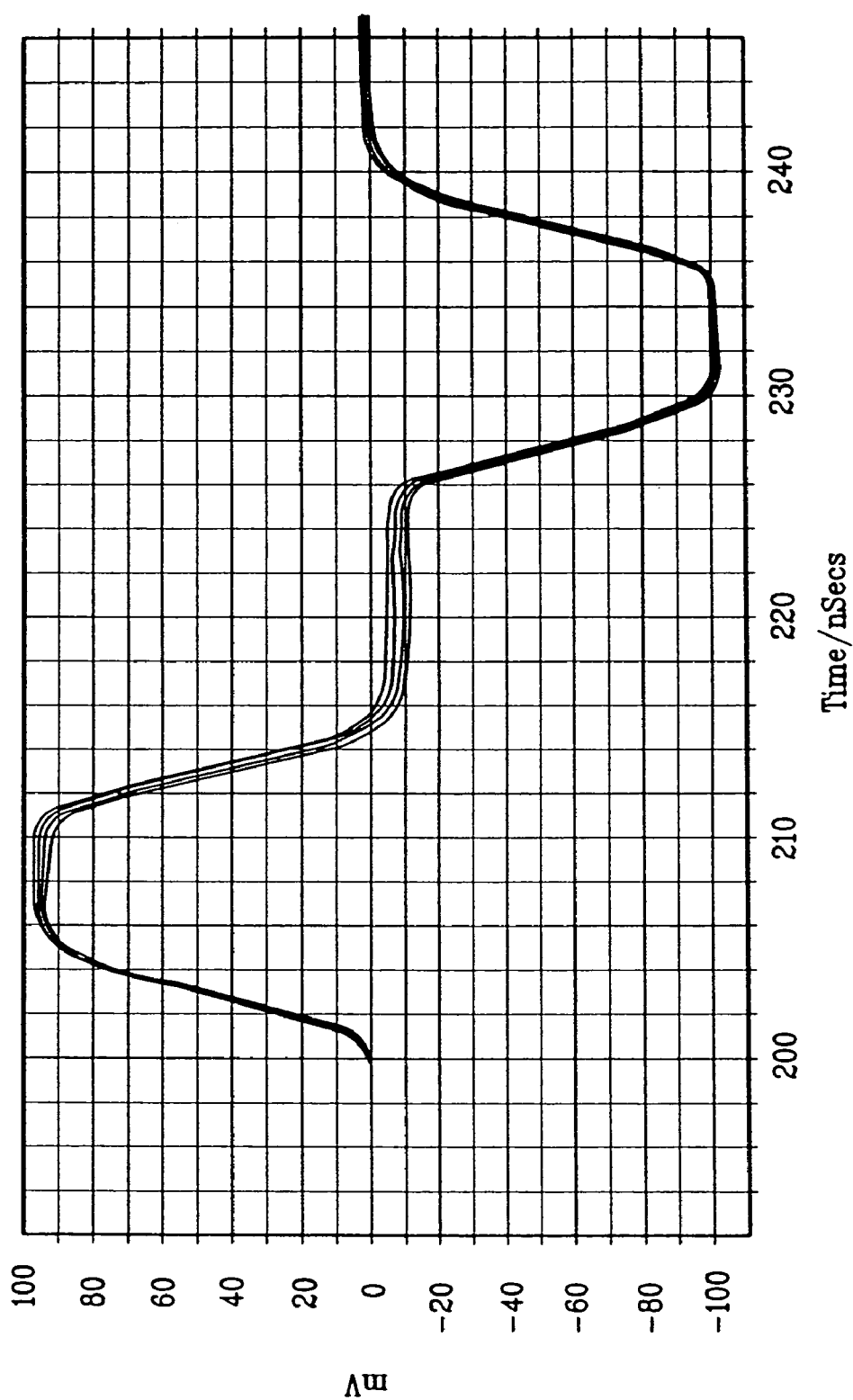
FIG. 10 illustrates reception of bipolar pulses, according to the invention.

It is beneficial to use transmission signals that have very little spectral power density at low frequencies, since the transmission network has a zero at DC. Accordingly, FIG. 10 illustrates several received pulse shapes for two successive pulses of opposite polarity. In particular, FIG. 10 provides a graphical representation of the signal strength available with the invention. Pulses correspond to the range of characteristic impedances of the stub line from 600 Ohms to 2000 Ohms so as to provide minimum intersymbol interference. The transmitted pulses have amplitudes of ±1 V and a pulse duration of 7 ns each, with the delay between them equal to 25 ns. As compared to the graphical representation in FIG. 6, depicting prior art systems, it should be appreciated that the invention provides less attenuation of the inputted signal, and over a smaller time interval.

Figure 11:
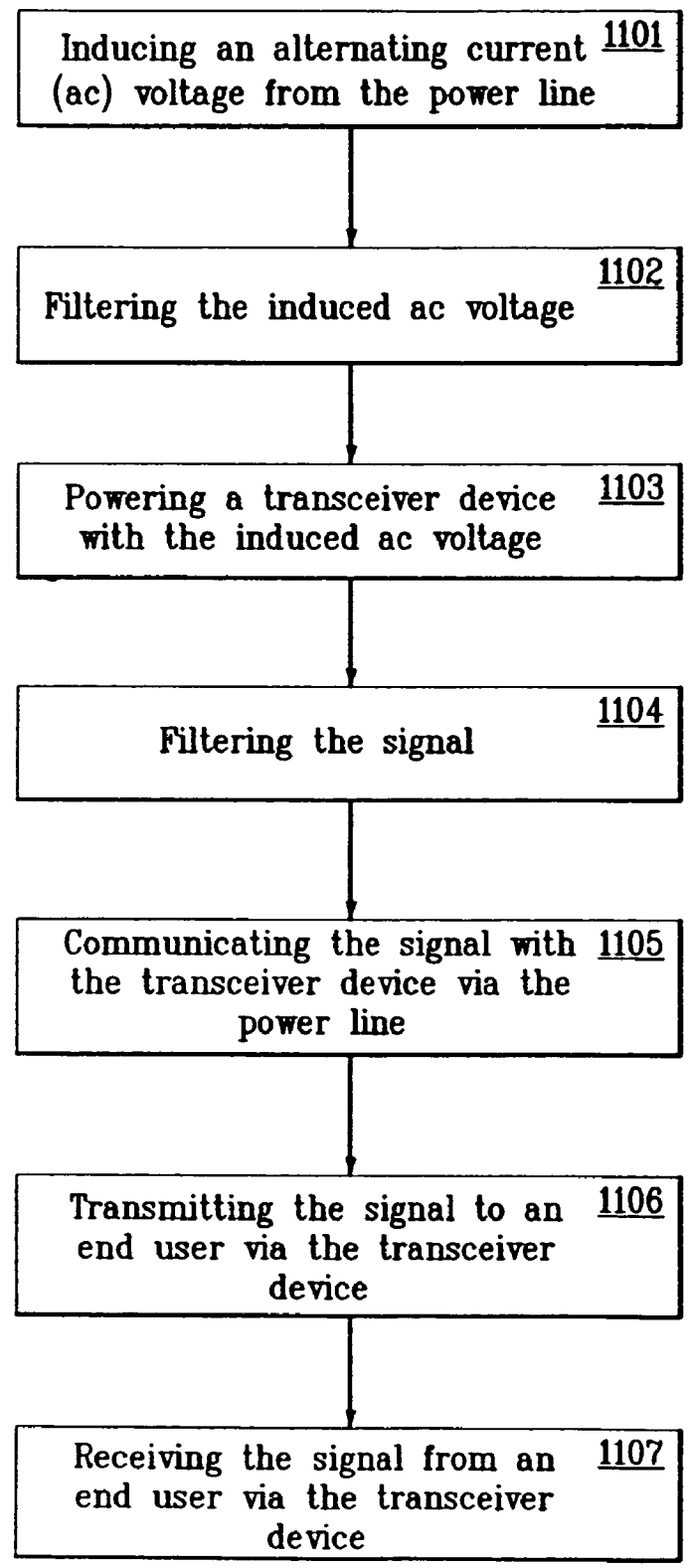
FIG. 11 is a flow diagram of a method for transporting a signal over a power line, according to the invention.

FIG. 11 is a flow diagram of a method for transporting a signal over a power line. As shown in FIG. 11, at step 1101, an AC current voltage is induced from the power line. At step 1102, the induced AC voltage is filtered, for example, by a low-pass filter. At step 1103, a transceiver device is powered by the induced AC voltage. At step 1104, the signal is filtered, for example, by a high-pass filter. At step 1105, the signal is communicated between the transceiver device and the power line. At step 1106, the signal is transmitted to an end user via the transceiver device. At step 1107, the signal is received from an end user via the transceiver device.

Figure 12A:
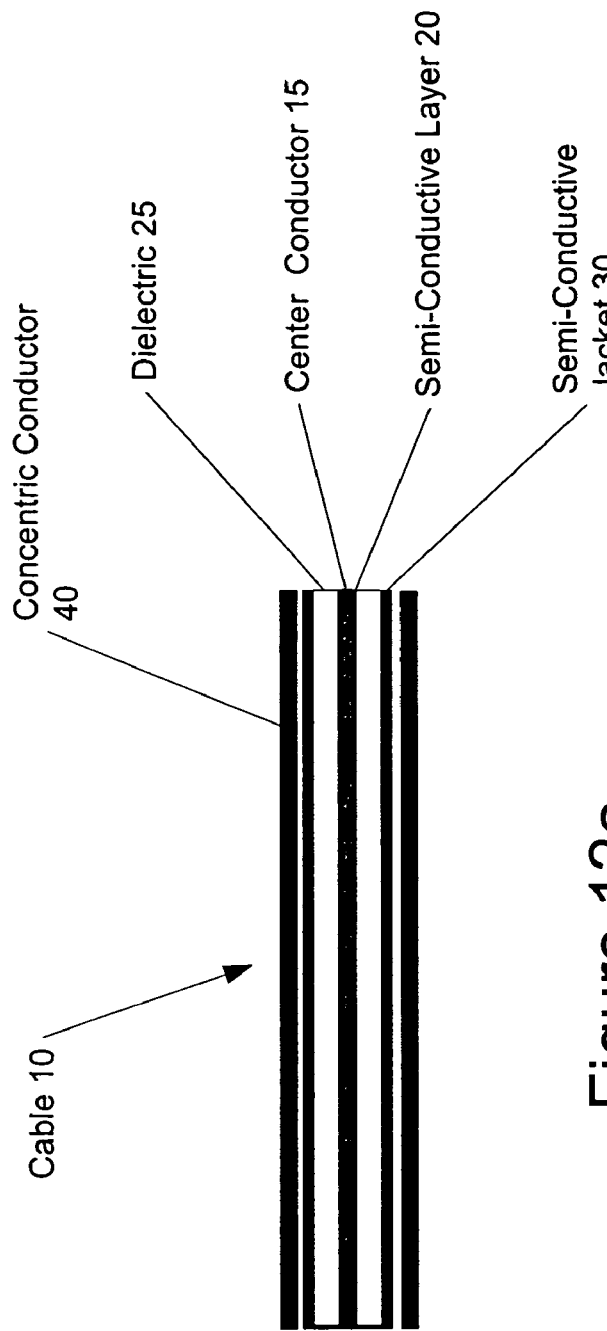
FIGS. 12a-b illustrate an example underground residential distribution (URD) cable with which some embodiments of the present invention may be employed.

As discussed, many underground residential distribution (URD) MV cables have a coaxial structure. As shown in FIG. 12a, an example URD MV cable 10 includes a center conductor 15 that carries the power signal. Surrounding the center conductor 15 is a semi-conductive layer 20. In this example cable, the semi-conductive layer 20 is surrounded by a dielectric 25 (i.e., an insulator). A semi-conductive jacket 30 surrounds the dielectric 25. The semi-conductive jacket 30 typically ensures, among other things, that ground potential and deadfront safety (the grounding of surfaces to which a utility company's lineman may be exposed) are maintained on the surface of the cable. Finally, a concentric conductor 40, which may act as the neutral conductor for power signal transmissions, surrounds the semi-conductive jacket 30. Thus, the center conductor 15 is separated from the concentric conductor 40 by dielectric 25 and semiconductor 20 (which acts as a dielectric at frequencies substantially above 50/60 Hz), thereby forming a coaxial structure. At high frequencies, such as those above one megahertz, this structure may act as a transmission line with properties of, or similar to, a wave guide. In some embodiments, this structure has the characteristics of a conventional coaxial transmission cable.

Figure 12B:
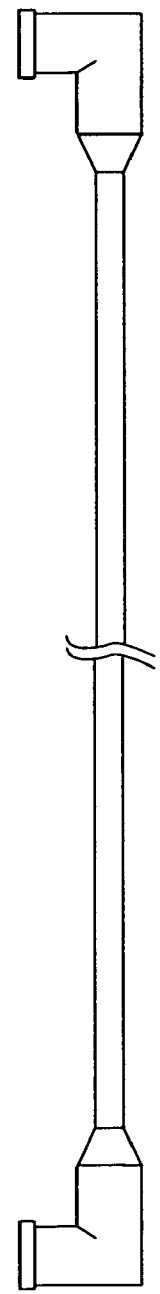

As shown in FIG. 12b, the cable may terminate with an elbow on one or both ends. For example, if the cable is to be plugged into a bushing at a transformer, the cable typically will terminate with an elbow. In other instances, the underground cable will extend up a utility pole and terminate with a "pothead" connector (not shown) for connection to an overhead MV power line (known as a Riser-Pole).

The coupler may be designed for coupling data signals to and from a URD power cable comprising a center conductor, insulator, concentric conductor, and may also have other elements such as an external insulator. The URD cable described for the use with the present example embodiment comprises those elements shown in FIG. 12a. However, as will be evident to those skilled in the art, the present invention is not limited to cables having all of those elements and may work equally as well with cables having fewer or more elements.

This example embodiment of the present invention may be constructed from an existing URD cable that already is installed in the electrical power distribution network and does not require severing the center conductor of the URD cable. Although installation does not require contact with high voltages, it may be desirable to disconnect both ends of the URD cable from power to ensure safety of installation personnel. In other embodiments, the coupler may be constructed during manufacturing of the cable (e.g., before the elbow or pothead are installed on the end of the cable or before installation of the cable into the electric power distribution system).

The coupler may be installed at or near a transformer (e.g., inside the transformer enclosure). In the following example, the URD cable is modified near both ends of the cable and adjacent the respective elbow. Consequently, the coupler may be installed on both ends of the URD cable for transmission along the cable and between underground or pad mounted transformers in an URD PLCS. The construction may be similar at both ends and therefore construction of one coupler is described herein.

Figure 13:
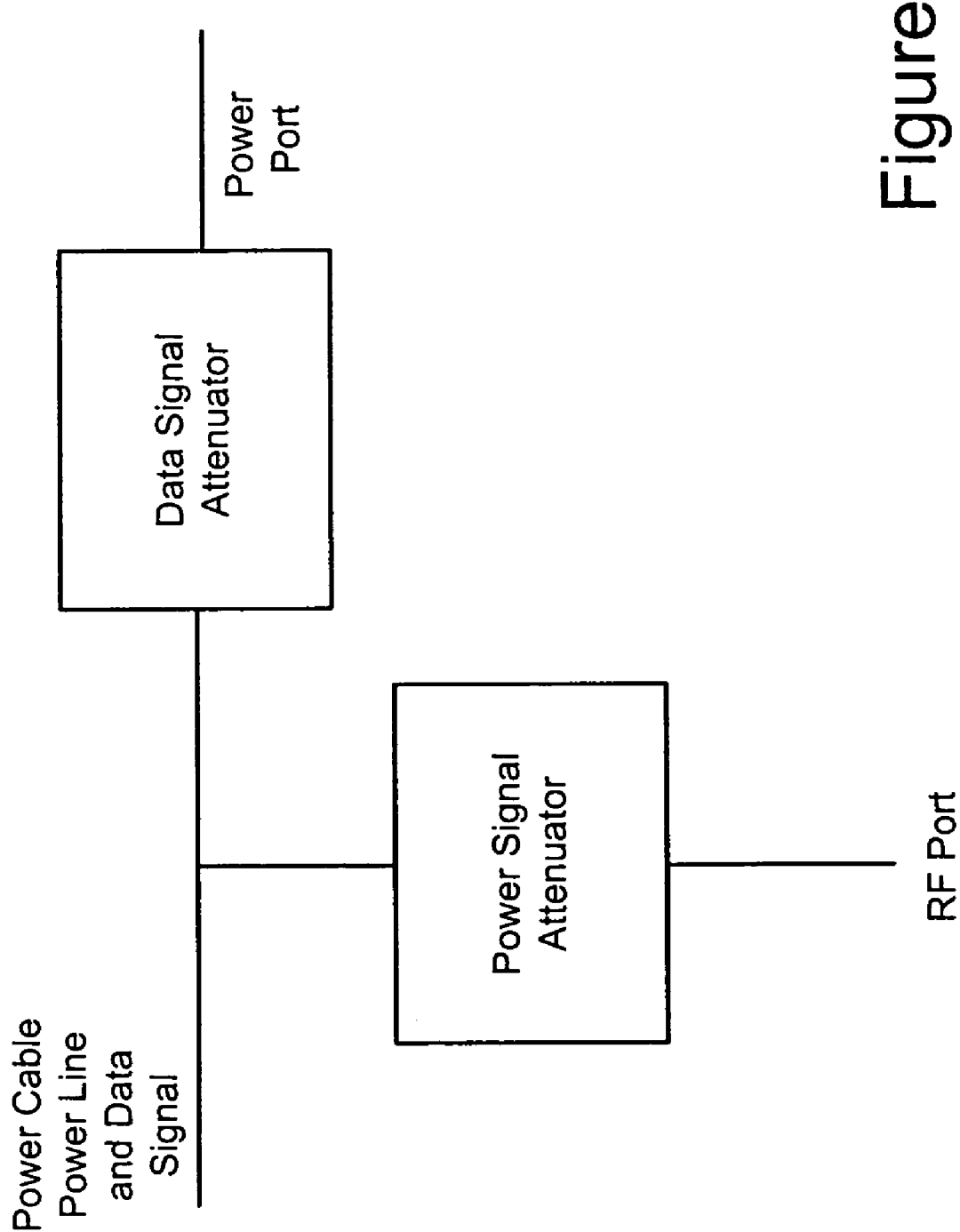
FIG. 13 is a block diagram of an example embodiment, according to the invention.

Referring to FIG. 13, one particular embodiment may comprise a power signal attenuator comprising a high pass filter disposed between the cable and the RF port (data port). The power signal attenuator may prevent the high voltage power signal from being conducted to the RF port and thereby ensures the safety of the PLCS equipment, installation personnel, and PLCS subscribers. In addition, a data signal attenuator (e.g., a low pass filter) may be disposed between the connection of the RF port and the end of the cable (e.g., the elbow or other termination). Federal regulations limit the amount of emissions from PLCSs, which thereby reduces the amount of power that may used to communicate the data signals. The data signal attenuator attenuates data signals traversing toward the end of the cable and thereby reduces emissions that would otherwise occur at the elbow (and transformer) or "pothead" termination, thereby permitting transmitting data signals with increased power. In addition, the data attenuator enhances the ability to reuse frequencies (e.g., using the same frequencies to communicate data on both sides of the distribution transformer).

Figure 14:
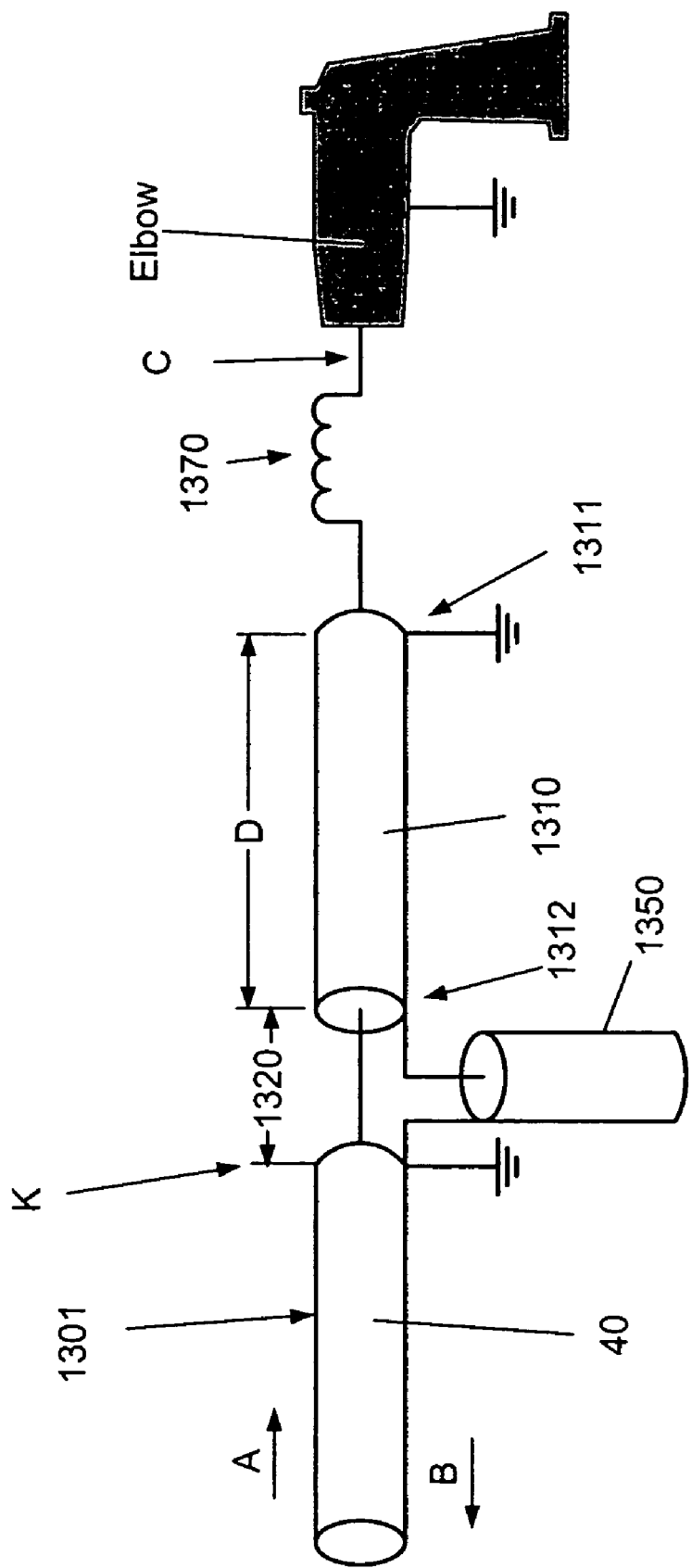
FIG. 14 is a functional block diagram of an example embodiment, according to the invention.
Figure 15:
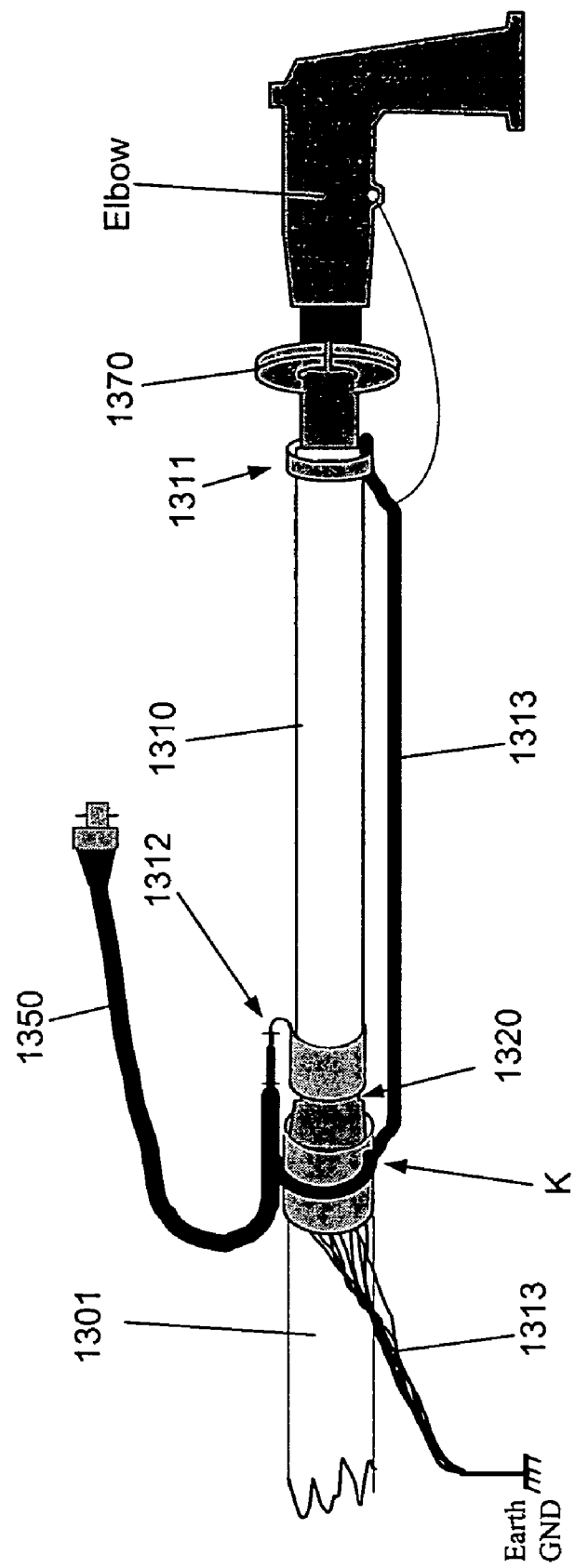
FIG. 15 illustrates an example implementation of the embodiment of FIG. 14.

Referring to FIGS. 14 and 15, in this example embodiment, the concentric conductor 40 (and outer insulator if present) are removed between the elbow and a point of installation K. In practice, the concentric conductor 40 may be detached or cut from the elbow and pulled back to point K. In the present example, removing the concentric conductor 40 (and insulator if present) exposes the semi-conductive jacket 30 of the cable. In FIG. 14, in certain places the cable 1301 is schematically represented by a cylinder, which represents the cable with the center conductor 15, insulator 25, and concentric conductor 40. In other places, the cable 1301 is represented by a line (e.g., such as at gap 1320 or at arrow C), which represents the cable with the concentric conductor 40 removed, but with the dielectric (insulator) 25 and center conductor 15 present. Of course, the cable (whether represented by a cylinder or line) may also comprise the semi-conductive jacket 30, semi-conductive layer 20, and outer insulator provided the cable employed has all those elements.

After the removal of the concentric conductor 40 from the end portion of the cable 1301, a coupling line 1310 of length D may be installed around the cable adjacent to the point of installation K to where the concentric conductor 40 has been removed. However, there is a gap 1320 between the position to which the concentric conductor 40 has been removed (point K) and the end 1312 of the coupling line 1310 so that they may not be electrically connected across the gap. As will be discussed below, the gap 1320 may act as an insulating barrier between the outer concentric conductor 40 of cable 1301 and the coupling line 1310. In this example embodiment, the coupling line 1310 may be in contact with the semi-conductive jacket, which extends to the concentric conductor 40 of the cable 1301. The coupling line 1310 is a conductive material and may have the same or similar conductive properties to those of the concentric conductor 40 and may be flexible. Thus, the coupling line 1310 may be formed of a conductive tape, which is wound around the exposed semi-conductive jacket. Alternately, the coupling line 1310 may be formed of a mesh (or braid) that is wrapped around and attached to the cable. In another embodiment, the coupling line 1310 may be formed of a conductive sheath that is clamped onto or slid around the cable. Alternately, the coupling line 1310 may be formed of a plurality of cylinder shaped conductive sheaths that are all electrically and mechanically connected to remain flexible. In still another embodiment, the coupling line 1310 may remain a portion of the concentric conductor and is formed by removing the concentric conductor at the gap 1320, and the portion of the concentric conductor between the coupling line 1310 and the elbow.

The coupling line 1310 may be attached to earth ground at its first end 1311. At its second end 1312, the coupling line may be attached to a data cable 1350, which may comprise one or two conductors, that is communicatively coupled to a transceiver (not shown). The transceiver may be Homeplug™ compatible (e.g., 1.0 or AV), or may be a cable modem (e.g., and be DOCSIS (Data Over Cable Service Interface Specification) compliant or compatible). In this embodiment, the coupling line 1310 may be attached to the center conductor of a coaxial cable 1350, which forms the data cable (or data port). The concentric conductor of the coaxial cable 1350 may be connected to the concentric conductor 40 of the cable 1301 as shown or may be connected to ground separately.

Finally, a data attenuator 1370 may be provided on the cable 1301 between the coupling line 1310 and the elbow or otherwise adjacent the coupling line 1310 and opposite the gap 1320. In this example embodiment, the data attenuator 1370 may be comprised of one or more magnetically permeable toroids disposed in a housing having a first and second portion coupled together via a hinge. The housing is clamped over the exposed semi-conductive jacket of the URD cable (where the concentric conductor has been removed). The toroids provide an inductance and, therefore, an impedance, to high frequencies such as data signals, and substantially no impedance to the low frequency power signal. In this example embodiment, the toroids have a gap, which may be an air gap, to prevent saturation of the toroids by the power signal. In some embodiments, a data attenuator 1370 may not be necessary.

As shown in FIG. 15, the elbow, coupling line 1310, and concentric conductor 40 are all connected to ground. This may be accomplished by attaching a ground conductor 1313 to the concentric conductor 40 at the point of installation K and attaching the ground conductor 1313 to the first end 1311 of the coupling line 1310. However, the ground conductor 1313 may traverse over the coupling gap 1320 in spaced apart relation from the coupling gap as shown in FIG. 15. Similarly, the ground conductor 1313 may be spaced apart from the coupling line 1310 as well. In some embodiments, the ground conductor 1313 may be an insulated wire. In other embodiments the ground conductor 1313 may be physically separated from the coupling line 1310 and gap 1320 via a spacer. In still other embodiments, both a spacer and insulated wire may be used. The conductive path between the coupling line 1310 and ground provided, at least in part, by the ground conductor 1313 may have a small amount of self-inductance. Additionally, or alternately, inductance may be added via an inductor placed in series with the ground conductor 1313 or via toroids disposed around the ground conductor 1313. The inductance provides an impedance to the data signals thereby reducing the amount of energy from the data signals that is conducted to ground from the end 1311 of the coupling line 1310 and ensuring more energy is reflected back down the cable 1301 along the coupling line 1310.

The ground conductor 1313 also may traverse through the aperture of the toroids 1370 or, as shown in FIG. 15, traverse outside the toroids 1370 to attach to the elbow to ground. The coupling line 1310 may be installed, or the elbow (or "pothead") attached, so that the elbow (or "pothead") is within a certain distance (e.g., two feet) of the end 1311 of the coupling line 1310, or more preferably within five feet thereof. In addition, the coupling line may be installed inside the transformer enclosure.

As the data signal traverses from a transmission point down the URD cable 1301 towards the elbow in the direction of arrow A in FIG. 14, the URD cable will act as a coaxial transmission line at the frequencies used to communicate the carrier frequencies, which may be greater than one megahertz, or more preferably greater than thirty megahertz. Thus, the signals will traverse the URD cable 1301 and be contained between the center conductor and the concentric conductor 40, which is in contrast from simply being transmitted on the concentric neutral conductor 40. The data signals eventually will reach the coupling gap 1320 where the concentric conductor 40 has been removed and a first portion of the energy of the data signal will couple to the coupling line 1310, as it propagates in the direction of arrow A, and be coupled to the coaxial cable 1350 (data port) via the coupling line 1310. A second portion of the energy of the data signals also may not be coupled to the coupling line 1310 at the gap 1320 while traversing in the direction of arrow A. This second portion of the energy of the data signals will reach the discontinuity created by the end 1311 of the coupling line 1310 where a portion of that energy of the data signals will continue towards to the elbow and another, substantial portion of the energy of the data signals may be reflected back toward the coupling gap 1320 along the coupling line 1310. As is known in the art, the physical discontinuity of a concentric conductor (e.g., the end 1311 of the coupling line 1310) causes a discontinuity in the coaxial transmission line (i.e., the cable) thereby causing power to be reflected. The energy of the reflected data signals will travel in the direction of arrow B and be coupled to the coupling line 1310 as they propagate. When the data signals reach the end 1312 of the coupling line 1310, the energy will add to the first portion of the energy of the data signals traveling in the direction A that is coupled to the coaxial cable 1350 and also be coupled to the coaxial cable 1350.

In addition to being reflected back towards the coupling gap 1320 by the discontinuity at the end 1311 of the coupling line 1310, the reflection causes a phase shift of the data signal by zero degrees, well known in the art as an "open stub." The length D of the coupling line 1310 in this example embodiment may be approximately one half of a wavelength of the carrier frequency. Consequently, the data signals may "shift" one half of a wave length as it propagates from the coupling gap 1320 to the end 1311 of the coupling line 1310, where it is reflected, and then travels back toward coupling gap 1320 traversing another one half of a wavelength. Thus, data signals that traverse across the coupling gap 1320 to the end 1311 of the coupling line 1310 that are reflected back to the coupling gap 1320, are three hundred sixty (360) degrees out of phase—or in phase—with the portion of the energy of the data signals that couples to the coaxial cable upon a first arrival at the coupling line 1310. A portion of the reflected data signal is then coupled to the data cable 1350 upon arrival at the coupling gap 1320. Thus, the portion of the energy of the data signals that is reflected and then coupled to the data cable 1350 is additive to the portion of the energy of the data signals that couples to the data cable upon first arrival at the coupling line 1310 and thereby increases the total energy or total power of the data signals that is coupled to the coaxial cable 1350. Consequently, the discontinuity at the end 1311 of the coupling line 1320 that causes the reflection in combination with proper selection of the length of the coupling line 1310 increases the efficiency of the coupler, or in other words, reduces the loss of the coupler. In addition, the discontinuity and reflection of a portion of the energy caused by the discontinuity provide some isolation of the data signals from the power port (e.g., FIG. 13).

In practice, the length D of the coupling line 1310 need not be exactly one half of a wavelength of the carrier frequency. While the greatest increase in the power of the reflected data signals may occur with the coupling line 1310 having a length equal to a half of a wavelength, the reflection may still be additive and therefore increase the coupling efficiency (improve performance) even if the coupling line 1310 has a length that is less than or greater than one half of a wavelength of a carrier frequency. Thus, the length D of the coupling line 1310 preferably may be within fifty percent of one half of a wavelength of a carrier frequency, more preferably within twenty-five percent of one half of a wavelength of a carrier frequency, or still more preferably within ten percent of one half of a wavelength of a carrier frequency (in each instance greater than or less than one half of a wavelength).

It may be desirable to design the coupler to be as small as functionally possible to increase the ease of installation and to reduce manufacturing and/or installation costs. Consequently, the length D of the coupling line 1310 may be less than one half of a wavelength of the highest, lowest, or center frequency of the carrier frequencies used to communicate data signals. For example, in some embodiments the length D of the coupling line 1310 preferably may be less than one hundred percent, more preferably less than ninety percent, even more preferably may be less than seventy-five percent, or still more preferably may be less than fifty percent of one half of a wavelength of a carrier frequency used to communicate the data signals.

In addition, the data signals may be communicated using a range of frequencies (hereinafter the "communications frequency band"). Consequently, the length of D may be proportional to the wavelength of the highest, the lowest, the center, or another middle frequency of the communications frequency band. Thus, in some embodiments the length D of the coupling line 1310 preferably may be less than one hundred percent, more preferably less than ninety percent, even more preferably may be less than seventy-five percent, or still more preferably may be less than fifty percent of one half of a wavelength of the highest, the lowest, and/or the center frequency of the carrier frequencies used to communicate the data signals Not all of the energy of the data signal is reflected by the discontinuity at the end 1311 of the coupling line 1310. A portion of the energy may continue (towards the elbow in this embodiment) until it reaches the data attenuator 1370. The data attenuator 1370, which is an inductor in this embodiment, provides a low pass filter that attenuates at least a portion of the energy. Thus, this embodiment of the coupler is designed as a directional coupler (i.e., bi-directional communications in one section of the cable).

In transmitting data signals, the reciprocal of receiving data signals generally occurs. The data signals may be coupled from the center conductor of the coaxial cable 1350 to the cable 1301 via connection to the coupling line 1310. Once data reaches the end 1312 of the coupling line 1310, a first portion of the energy will propagate in the direction of arrow A (towards the elbow) and a second portion of the energy may propagate in the direction of arrow B (away from the elbow). Thus, this first portion of the energy will propagate from the coaxial cable 1350 to the coupling line 1310, down the cable 1301 along the coupling line 1310 in the direction of arrow A towards the elbow. As it propagates, a portion of the energy is coupled to the center conductor of cable 1301. The data signals will reach the discontinuity created by the end 1311 of the coupling line 1310 where a portion of the energy of the data signals may continue towards to the elbow and another, substantial portion of the energy of the data signals may be reflected back toward the coupling gap 1320 along the coupling line 1310 in the direction of arrow B. The reflected data signals may travel in the direction of arrow B and be coupled to the center conductor as they propagate. When the data signals on the center conductor reach the end 1312 of the coupling line 1310, their energy will add with the second portion of the energy of the data signals on the center conductor of cable 1301 traveling in the direction B, which is coupled from cable 1350. Thus, the first reflected portion of the energy may be additive to the second portion of the energy and thereby increase the overall power of transmitted data signals (as compared to if there was no reflected portion). This is known in the art as a reciprocal device. As will be evident to those skilled in the art, this embodiment may have different equivalent circuit than that shown in FIG. 8.

Figure 16:
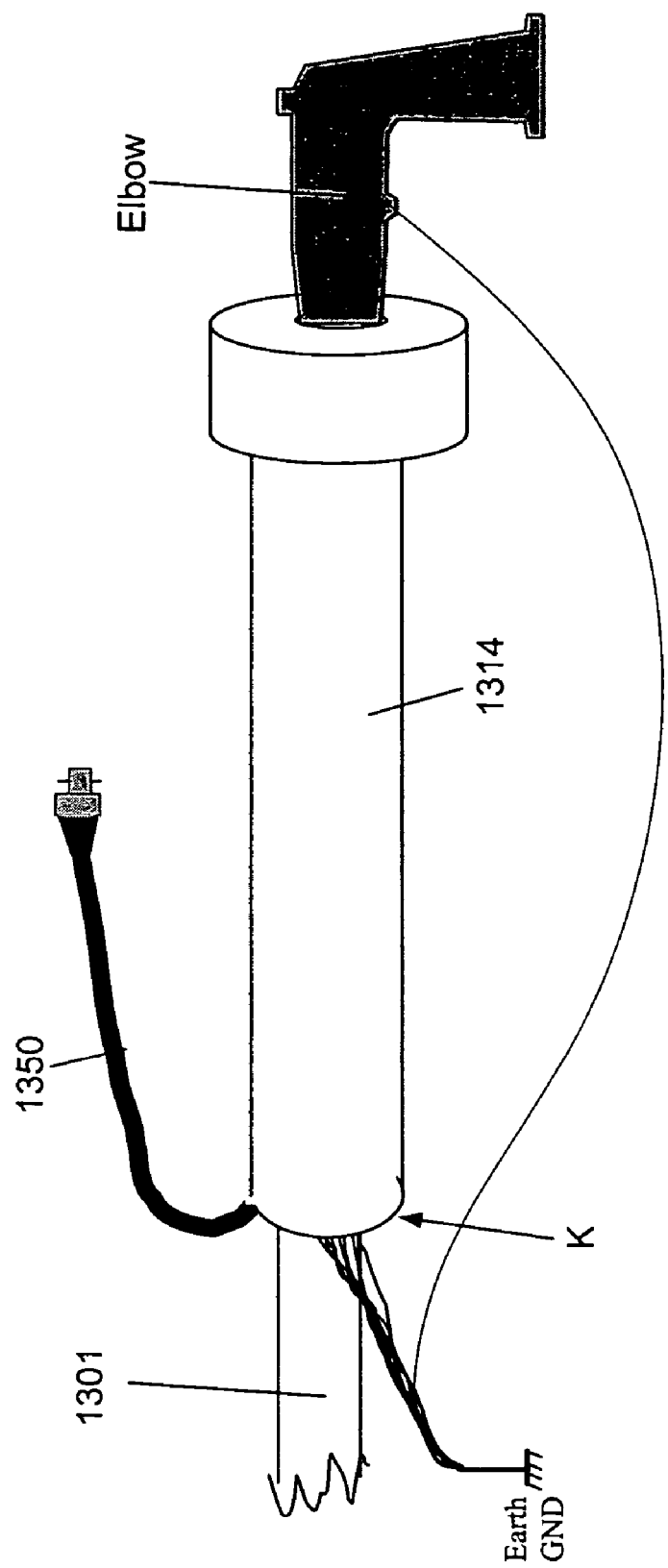
FIG. 16 illustrates an example implementation of the embodiment of FIG. 14.

As shown in FIG. 16, the entire assembly may be enclosed in a flexible housing 1314. The housing 1314 may comprise a first and second portion that couple together (e.g., clamp together via a hinge) around the entire line. One end of the housing may attach to the cable 1301 adjacent the installation point K and the other end may extend to, or nearly to, the elbow. The ground conductor 1313 discussed above may extend from the housing 1314 to be connected to ground or may attach to the housing 1314 (e.g., on the inside) and the housing 1314 may be connected to ground via a separate cable. Thus, the housing 1314 may be formed of a conductive material having an internal and external layer of insulative material. If formed substantially of a conductive material and grounded, the conductive housing 1314 may provide reduced emissions from the data signals.

In the above described embodiment, the data attenuator comprises an inductor formed via one or more toroids disposed around the cable at a location where the concentric conductor is not present. In another embodiment, the data attenuator may comprise a series connection of coaxial transmission lines of different impedances. The lengths and impedances of each coaxial transmission line in the series may be designed to match a lumped element filter.

Figure 17A:
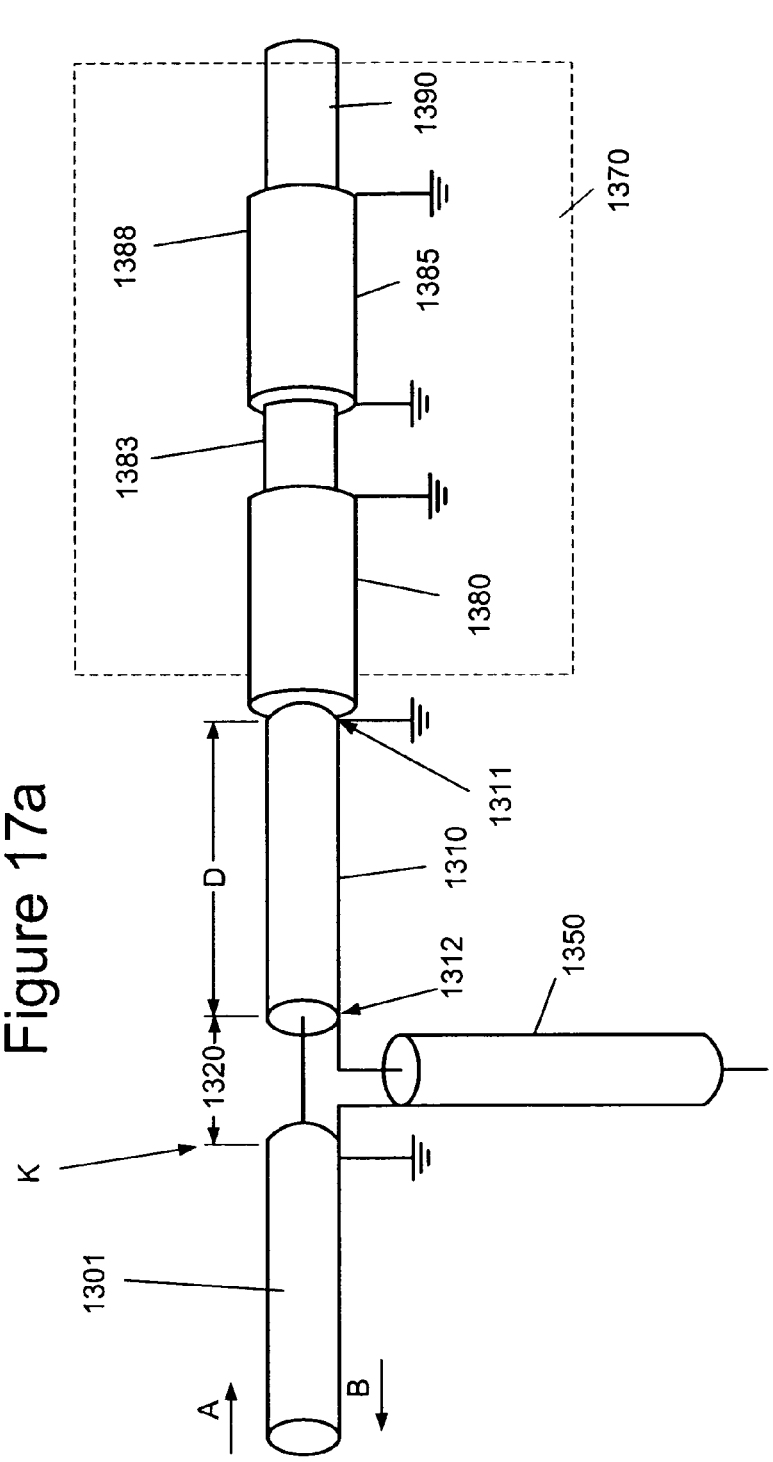
FIGS. 17a-b are functional block diagrams of another example embodiment, according to the invention.
Figure 17B:
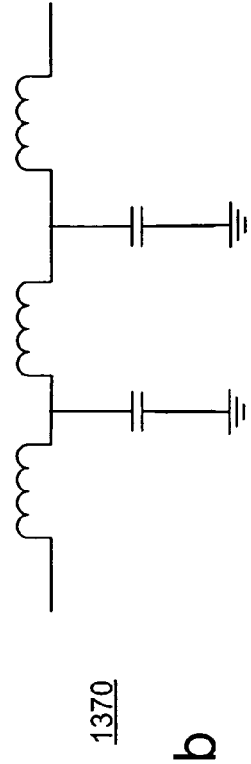

FIG. 17 schematically depicts one example of such an embodiment. In this example embodiment, the data attenuator 1370 is comprised of a series of three transmission lines of differing impedances and, therefore, comprises four impedance discontinuities. As is known to those skilled in the art, a series of transmission lines of differing lengths and impedances will provide the equivalent of lumped elements whose impedances and types (inductive or capacitive) may be approximated using Richard's transform and Kuroda's identities. In general, a length of transmission line of relatively high impedance approximates a series inductance and lengths of transmission line of relatively low impedance approximate a shunt capacitance. The data attenuator 1370 of FIG. 17*a* may be approximated with the circuit shown in FIG. 17*b*, which is a fifth order Butterworth low pass filter, with the values of the capacitors and inductors being dependent on the impedances and lengths of the differing impedances in the series of data attenuator 1370 in FIG. 17*a*. Thus, the data attenuator 1370 need not be inductive or be toroids and may be any suitable attenuating mechanism.

Figure 18:
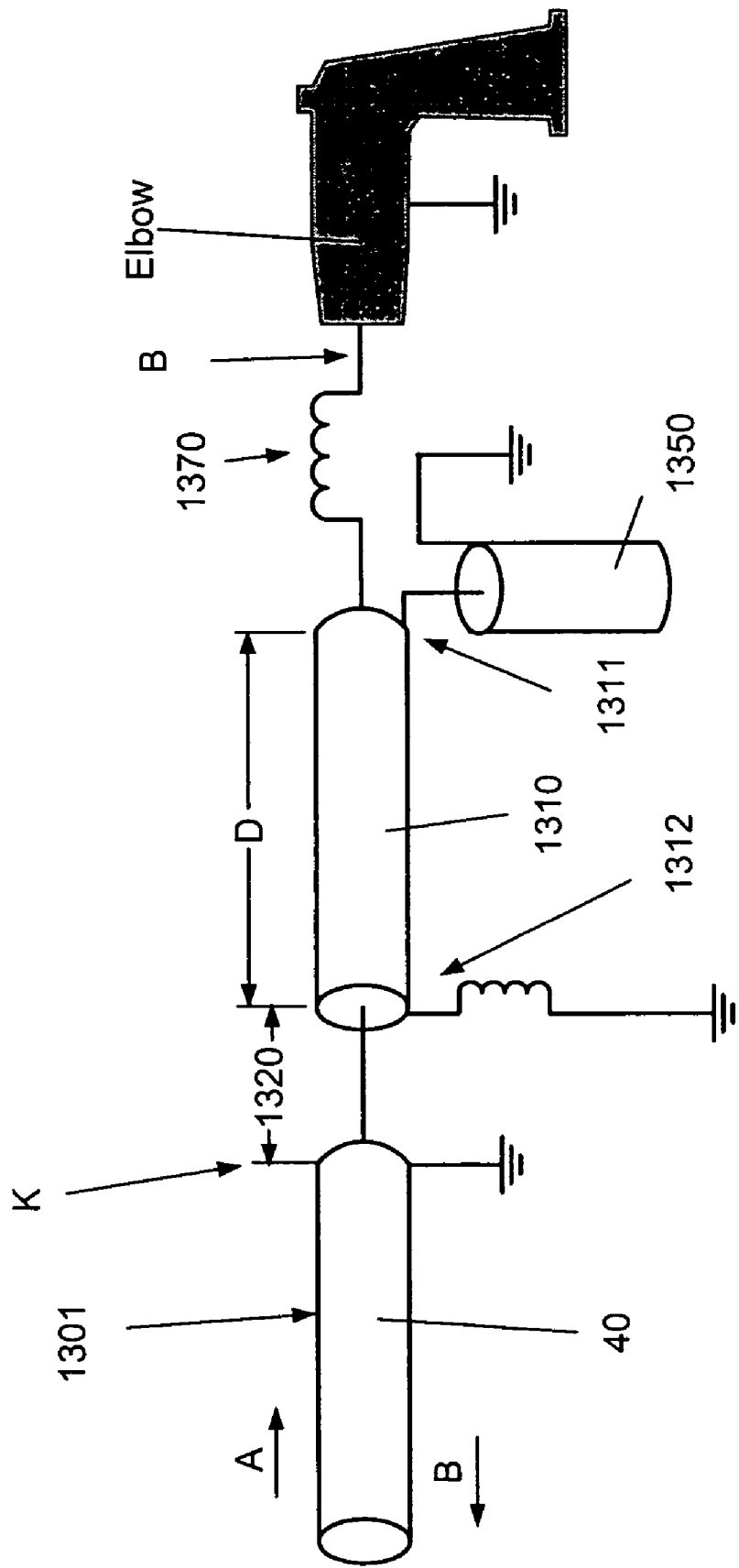
FIG. 18 is a functional block diagram of another example embodiment, according to the invention.

In another embodiment of the invention shown in FIG. 18, the coupling line 1310 is connected to ground via an inductor at its second end 1312. The first end 1311 of the coupling line 1310 is connected to the center conductor of the coaxial cable 1350. The concentric conductor of the cable 1350 is connected to ground as shown. The inductor between ground and the end 1312 of the coupling line 1310 may create a data attenuator and, therefore, may elevate the coupling line 1310 to a voltage proportional to the voltage of the data signals. In essence, the gap 1320, inductor in the ground path, and other features of this embodiment may act to create a voltage on the coupling line (relative to the center conductor) that is proportional to the data signals. This voltage may be conducted to the cable 1350 at the end 1311 of coupling line 1310. Because this embodiment is a reciprocal device, the transmission of data signals will operate in substantially the reciprocal manner and need not be described herein.

Figure 19:
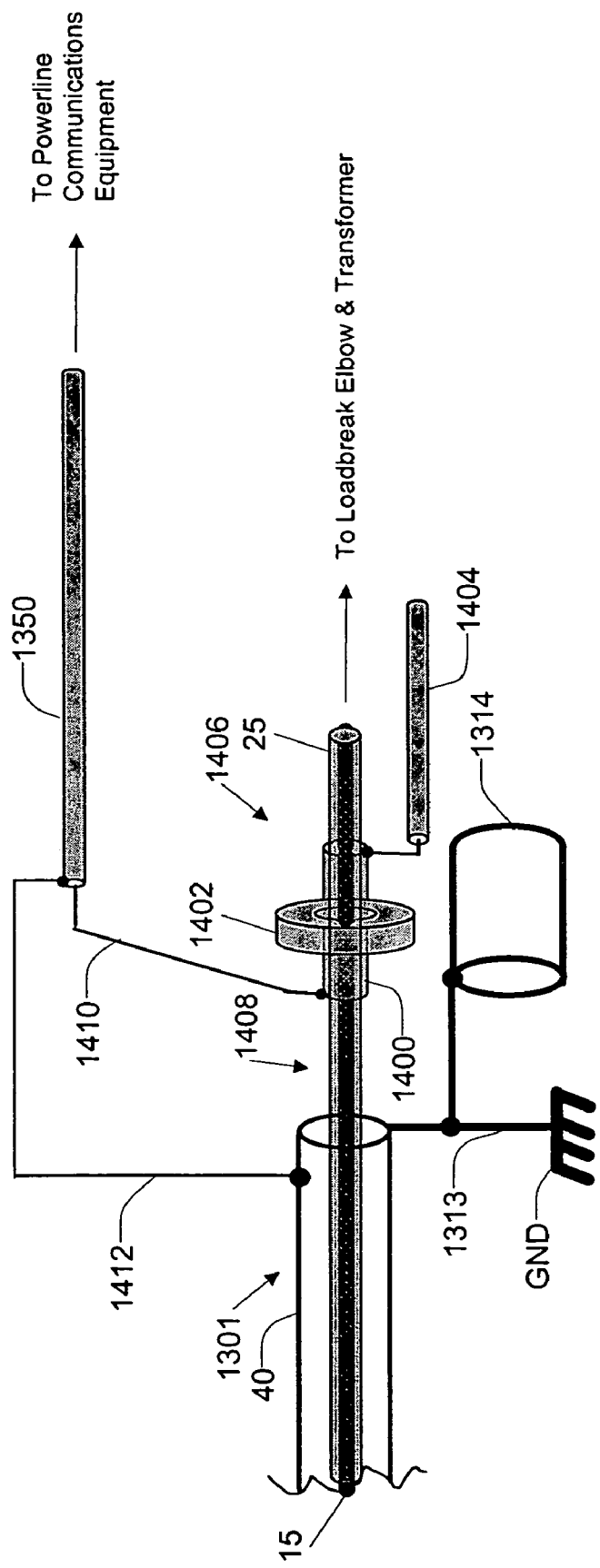
FIG. 19 illustrates another example embodiment of the invention.

FIG. 19 illustrates another example embodiment of a coupler, according to the invention. The coupler is formed by a coupling line 1400, a common mode choke 1402, and a delay line 1404 located along a portion 1406 of a high voltage power cable 1301. The high voltage cable 1301 may include a center conductor 15, a dielectric 25, a concentric conductor 40 (also described herein as a 'neutral'), and an outer insulating sleeve (not illustrated). In some embodiments the cable 1301 also may include a semi-conductive layer between the center conductor 15 and dielectric 25, and a semi-conductive jacket between the dielectric 25 and the outer concentric conductor 40. The cable 1301 and its components are given like part numbers to the cable and cable components previously described and perform like functions.

This embodiment also includes a coupling line 1400 that is disposed substantially around the entire circumference of the dielectric 25 of the cable 1301. The coupling line 1400 may be formed of conductive material and may be flexible and also may have the same or similar conductive properties to those of the concentric conductor 40. Accordingly, the coupling line 1400 may be a tape, a mesh, a sheath, a hinged cylinder, a plurality of any one or more of the same, or another conductor structure. Alternatively, the coupling line 1400 may be a portion of the concentric conductor 40, and be formed by removing the concentric conductor to form gaps 1408 at either end of the coupling line 1400. Thus, the coupling line 1400 may be cylindrical conductor surrounding a portion 1406 of a high voltage cable 1301.

In one embodiment the coupling line 1400 is formed as a metal cylinder approximately three to four inches in length, although the specific dimension may vary. In some embodiments the coupling line 1400 is hinged for easy installation. The coupling line 1400 may be spaced approximately 0.5 inches from the end of neutral 40 (concentric conductor) of the cable 1301, although one skilled in the art will appreciate that other dimensions may be used.

In embodiments where a shield gap is cut in the concentric conductor 40 around the entire periphery of the high-voltage cable 1301, the concentric conductor is effectively divided into two parts. Note that only one part of the divided concentric conductor 40 is shown in FIG. 19. The end of the coupling line 1400, however, does not butt up against the end of the severed concentric conductor 40. A gap 1408 occurs between the end of the coupling line 1400 and the end of the concentric conductor 40 so that they are not electrically connected across the gap 1408. As described with regard to the prior embodiments above, the gap 1408 may be approximately 0.5 inches in length and may act as an insulating barrier between the outer concentric conductor 40 of cable 1301 and the coupling line 1400. A similar gap may be used between the opposite end of the coupling line 1400 and the other portion of the divided concentric conductor 40.

In one embodiment the common mode choke 1402 may be used and be formed by of magnetically permeable toroid concentric to the coupling line 1400 and may also include an air gap to reduce the likelihood of saturation of the choke 1402. In varying embodiments the toroid is in physical communication with the coupling line 1400, or is spaced apart from the outer surface of the coupling line 1400 (i.e., insulated therefrom). The choke 1402 alters the impedance (common-mode) of the coupler to thereby improve data signal coupling between the coupling line 1400 and the center conductor 15 of the high voltage cable 1301. Although only one toroid is illustrated, in other embodiments one or more additional toroids may be included concentric to the coupling line 1400 to improve isolation. For example, additional toroids may be located along other portions of the coupling line 1400. In still another configuration, multiple sets of concentric toroids are located along a length of the coupling line.

A delay line 1404 may be coupled to the second end of the coupling line 1400. The delay line 1404 serves as a delay and is selected to have desired dimensions for impedance matching and may enhance data signal coupling. The choke 1402 and delay line 1404, alone and in combination, improve coupling efficiency of the coupling line 1400. As a result, a shorter coupling line 1400 (or fewer or smaller toroids) may be used than would otherwise be used to achieve a desired coupling efficiency.

As with the other embodiments described, the coupler serves to couple a transceiver to the high voltage power line 1301, allowing the transceiver to communicate data signals over the high voltage power line 1301. In one embodiment a coaxial cable 1350 links the transceiver to the coupler. As previously described, the coaxial cable 1350 may include a center conductor 1410 connecting the transceiver to the first end of the coupling line 1400, and an outer shield conductor 1412 coupled to the concentric conductor 40. The outer conductor 1412 may be connected to ground directly or by connecting to the concentric conductor 40.

A metal enclosure serves as a housing 1314 around the coupler and functions in like manner as the housing 1314 previously described. In one example embodiment, the housing may be formed of two portions that are pivotally connected together via a hinge. Each portion may include one of two portions of the common mode choke 1402 and the coupling 1400. When the housing 1314 is in its closed configuration, the coupling line 1400 and common mode choke 1402 are urged into the positions shown in FIG. 19. The concentric conductor 40 may be coupled to ground through a conductor 1313. Conductor 1313 may also include an RF choke (which may be formed by an inductor in series with a conductor 1313 or a magnetically permeable toroid around a conductor), which provides RF isolation in some situations where low impedance connection to the ground/neutral conductors is detrimental to coupling performance. Such situations are commonly found on "Riser-Pole" installations where many ground wires are connected together. The housing 1314 may be coupled to the concentric conductor 40 on a first end and to ground on its second end. The housing 1314 may be formed of a conductive material having an internal and external layer of insulative material. By forming the housing with a conductive material and grounding the housing, the housing 1314 may provide reduced emissions from the data signals. One skilled in the art will appreciate that other types of enclosures and grounding techniques may be used. The housing being bonded to ground also provides a level of operational safety for the persons handling the coupler on live power cables. This ground bonding will effectively conduct high amounts of current (e.g., 10,000 Amps or more in some embodiments) to ground in the event a fault occurs in the power cable under the coupler, preventing dangerous voltages from being present on any part or attachment of the coupler.

The invention is directed to a method and a device for transporting a signal over a power line. The invention occasionally was described in the context underground distribution systems, but is not so limited to, regardless of any specific description in the drawing or examples set forth herein. Also, the invention was described in the context of medium voltage cables, but also includes high voltage or low voltage cables. It will be understood that the invention is not limited to use of any of the particular components or devices herein. Indeed, this invention can be used in any application that requires such a coupler. Further, the system disclosed in the invention can be used with the method of the invention or a variety of other applications. In another embodiment, instead of a delay line 1404, the reactive element may comprise a capacitor connecting the second end of the coupling line 1400 to ground (e.g., the concentric conductor). In still another embodiment, in stead of a delay line, the second end of the coupling line may be connected to ground (e.g., directly, through the housing, or via the concentric conductor 40). As with the coupler described in FIGS. 13-18, the coupler may be a three port device in which data signals are communicated bi-directionally through two ports but are impeded from traversing through (to or from) the third port. Thus, while not shown in FIG. 19, the coupler may include a data attenuator 1370 (disposed on the cable 1301 adjacent the second end of the coupling line 1400) to further attenuate data signals.

The coupler may be located at any desired location to couple data signals to and/or from a power line, including at a backhaul point or riser-pole or forming part of a transformer bypass device at a transformer. Such a bypass device may include one or more of a low voltage signal processing circuit (which may include a filter, amplifier, and other components) a low voltage modem, a processor and associated software, a router, a medium voltage modem (e.g., a Homeplug™ compatible modem or a DOCSIS compatible cable modem), and medium voltage processing circuitry. Likewise, a backhaul device and repeater may include some subset of these components and/or other components. As is known in the art, in a URD system a first cable may connect power to the transformer, and a second cable may supply power to the next transformer. Both cables may terminate in an elbow and plug into a bushing on the transformer housing and the two cables typically are connected together inside the transformer housing. A separate coupler may be installed on each URD cable at the transformer (and on the opposite end of each cable). Thus, the data may be received via a first coupler by a PLCS network element (such as a bypass device or simply a filter and amplifier without demodulation) and then transmitted down the second cable via the second coupler. Because the coupler may isolate the data signal from the transformer, the PLCS network element at the transformer may receive data signals in the same frequency band via both URD cables simultaneously as the data signals on the two cables will not interfere with each other. Likewise, the PLCS network element at the transformer may transmit data signals on one cable and receive data signals in the same frequency band on the other cable simultaneously as transmission on one cable will not interfere with reception on the other cable. Thus, the coupler may be used in a frequency division or time division multiplexing communications system.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. A power line communications apparatus for communicating data signals over an underground power line cable carrying a power signal having a voltage greater than one thousand volts, the cable comprising a center conductor, a concentric insulator disposed external the center conductor, and a concentric conductor disposed over a first portion of the power line cable external to the insulator, the apparatus comprising:
    a coupling conductor disposed concentrically around a second portion of the cable external to said insulator and having a first end and a second end, wherein said concentric conductor is absent in a manner to form a gap between the concentric conductor and said first end of said coupling conductor;
    a transceiver cable coupled to a first end of said coupling conductor; and
    a common mode choke disposed substantially around the entire circumference of a portion of said coupling conductor.

2. The apparatus of claim 1, further comprising a reactive element conductively coupled to said second end of said coupling conductor.

3. The apparatus of claim 2, wherein said reactive element comprises a delay line.

4. The apparatus of claim 2, wherein said reactive element comprises a capacitor coupled to ground.

5. The apparatus of claim 1, further comprising an enclosure around a length of the cable to house said coupling conductor and said common mode choke, and wherein said gap is located along the length of the cable within said enclosure.

6. The apparatus of claim 1, further comprising a transceiver communicatively coupled to said transceiver cable and wherein said transceiver comprises a modem substantially compatible with a Homeplug standard.

7. The apparatus of claim 1, further comprising a transceiver communicatively coupled to said transceiver cable and wherein said transceiver comprises a modem substantially compatible with a DOCSIS standard.

8. The apparatus of claim 1, wherein said common mode choke comprises a magnetically permeable toroid.

9. The apparatus of claim 1, wherein said second end of said coupling conductor is coupled to ground.

10. A power line communications apparatus for communicating data signals over an underground power line cable carrying a power signal having a voltage greater than one thousand volts, the cable comprising a center conductor, a concentric insulator disposed external the center conductor, and a concentric conductor disposed over a first portion of the power line cable external to the insulator, the apparatus comprising:
    a coupling conductor disposed concentrically around a second portion of the cable external to said insulator and having a first end and a second end;
    a transceiver cable coupled to said first end of said coupling conductor;
    a magnetically permeable toroid disposed substantially around the entire circumference of a portion of said coupling conductor; and
    wherein said second end of said coupling conductor is communicatively coupled to ground.

11. The apparatus of claim 10, wherein said second end of said coupling conductor is coupled to ground via a capacitor.

12. The apparatus of claim 10, wherein said first end of said coupling conductor is spaced apart from the concentric conductor to form a gap between said concentric conductor and said first end of said coupling conductor.

13. The apparatus of claim 12, further comprising a conductive enclosure around a length of the cable to house said coupling conductor and said toroid, and wherein said gap is located along the length of the cable within said enclosure.

14. The apparatus of claim 13, where said enclosure is conductively connected to said concentric conductor.

15. The apparatus of claim 10, further comprising a transceiver communicatively coupled to said transceiver cable and wherein said transceiver comprises a modem substantially compatible with a Homeplug standard.

16. The apparatus of claim 10, further comprising a transceiver communicatively coupled to said transceiver cable and wherein said transceiver comprises a modem substantially compatible with a DOCSIS standard.

17. A method of communicating data signals over an underground power line cable, the cable comprising a center conductor, a concentric insulator disposed external the center conductor, and a concentric conductor disposed over a first portion of the power line cable external to the insulator, the method comprising:
    along a second portion of the cable where the concentric conductor is absent, attaching a coupling conductor around the insulator in a manner to form a gap between attaching a coupling conductor and the insulator in a manner to form a gap between first end of the coupling conductor and the concentric conductor;

positioning a magnetically permeable toroid substantially around the entire circumference of a portion of said coupling conductor; and communicatively coupling a transceiver to the coupling conductor.

18. The method of claim 17, wherein communicatively coupling the transceiver comprises coupling the transceiver to the first end of the coupling conductor.

19. The method of claim 17, further comprising coupling a reactive element to a second end of the coupling conductor.

20. The method of claim 19, wherein the reactive element comprises a delay line.

21. The method of claim 19, wherein the reactive element comprises a capacitor.

22. The method of claim 20, further comprising coupling the capacitor to ground.

23. The method of claim 17, further comprising coupling the second end of the coupling conductor to ground.

24. A power line communications apparatus for communicating data signals over an underground power line cable, the cable comprising a center conductor, a concentric insulator disposed external the center conductor, the apparatus comprising:

a concentric conductor disposed over the power line cable external to the insulator and substantially around the entire circumference of the power line cable;

wherein said concentric conductor includes a first and second portion spaced apart from each other via a gap;

a magnetically permeable toroid disposed substantially around the entire circumference said first portion of said concentric conductor; and a transceiver cable coupled to the first portion of the concentric conductor.

25. The apparatus of claim 24, wherein said first portion of the concentric conductor includes a first end defining a first side of said gap and a second end.

26. The apparatus of claim 25, further comprising a ground conductor configured to couple said second end of said first portion of said concentric conductor to ground.

27. The apparatus of claim 25, further comprising a delay line coupled to said second end of said first portion of said concentric conductor.

28. The apparatus of claim 25, further comprising a capacitor configured to couple said second end of said first portion of said concentric conductor to ground.

29. The apparatus of claim 24, further comprising an enclosure around a length of the cable to house said coupling conductor and said toroid, and wherein said gap is located along the length of the cable within the enclosure.

30. The apparatus of claim 24, wherein said first portion of said concentric conductor is not formed of a concentric neutral conductor of an underground residential distribution cable.

31. The method of claim 24, where said transceiver cable includes a first conductor and a second conductor and said first conductor is coupled to the first portion of the concentric conductor and said second conductor is coupled to the second portion of said concentric conductor.

* * * * *

UNITED STATES PATENT AND TRADEMARK OFFICE
CERTIFICATE OF CORRECTION

PATENT NO. : 7,248,148 B2
APPLICATION NO. : 11/265230
DATED : July 24, 2007
INVENTOR(S) : Kline et al.

It is certified that error appears in the above-identified patent and that said Letters Patent is hereby corrected as shown below:

On the title page, in field (75), in "Inventors", in column 1, line 2, delete "Farifax" and insert -- Fairfax --, therefor.

On page 3, in field (56), under "Other Publications", in column 1, line 10, delete "Intellion" and insert -- Intellon --, therefor.

On page 3, in field (56), under "Other Publications", in column 2, line 13, delete "Modem,"" and insert -- Modem", --, therefor.

On page 3, in field (56), under "Other Publications", in column 2, line 21, delete "Senor" and insert -- Sensor --, therefor.

In column 15, line 7, after "signals" insert -- . --.

In column 20, lines 65-66, in Claim 17, delete "attaching a coupling conductor and the insulator in a manner to form a gap between" and insert -- a --, therefor.

Signed and Sealed this

Thirtieth Day of October, 2007

JON W. DUDAS
*Director of the United States Patent and Trademark Office*